(12) United States Patent
Seo et al.

(10) Patent No.: US 11,153,649 B2
(45) Date of Patent: Oct. 19, 2021

(54) ELECTRONIC DEVICE AND DISPLAY METHOD THEREOF

(71) Applicant: SAMSUNG ELECTRONICS CO., LTD., Suwon-si (KR)

(72) Inventors: Jangwon Seo, Suwon-si (KR); Heejin Ko, Suwon-si (KR); Hyunjee Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/763,618

(22) PCT Filed: Nov. 29, 2018

(86) PCT No.: PCT/KR2018/014920
§ 371 (c)(1),
(2) Date: May 13, 2020

(87) PCT Pub. No.: WO2019/132268
PCT Pub. Date: Jul. 4, 2019

(65) Prior Publication Data
US 2020/0288199 A1    Sep. 10, 2020

(30) Foreign Application Priority Data

Dec. 29, 2017  (KR) .................. 10-2017-0184178

(51) Int. Cl.
*G06F 3/00* (2006.01)
*G04F 13/00* (2006.01)
(Continued)

(52) U.S. Cl.
CPC ......... *H04N 21/462* (2013.01); *G06F 3/0484* (2013.01); *H04N 21/478* (2013.01); *G06F 3/0482* (2013.01); *G06F 3/04817* (2013.01)

(58) Field of Classification Search
CPC .. H04N 21/462; H04N 21/478; G06F 3/0484; G06F 3/04817; G06F 3/0482
See application file for complete search history.

(56) References Cited

U.S. PATENT DOCUMENTS 8,151,215 B2   4/2012   Baurmann et al.
8,763,043 B2   6/2014   Sung et al.
(Continued)

FOREIGN PATENT DOCUMENTS

CN    1822649 A    8/2006
CN    101939718 A    1/2011
(Continued)

OTHER PUBLICATIONS

English Translation of KR-20180097921 with Foreign Application Priority Data of KR 10-2017-0024714 of US-20180247440-A1 (Year: 2017).*

(Continued)

*Primary Examiner* — Kyu Chae
(74) *Attorney, Agent, or Firm* — Sughrue Mion, PLLC

(57) ABSTRACT

An electronic device and a display method thereof are disclosed. An electronic device according to the present disclosure comprises: a display; and a processor for controlling an electronic device to operate in one of a wallpaper mode and a content mode, wherein, in the absence of a preset wallpaper, when a first user command is input while the display operates in the content mode for reproducing broadcast content, the processor controls the display to change and display the broadcast content to a first UI for entering the wallpaper mode; and, in the absence of a preset wallpaper screen, when a second user command is input while the display is operating in the content mode, the (Continued)

processor controls the display to change and display the broadcast content to a wallpaper setting screen for setting a wallpaper.

16 Claims, 22 Drawing Sheets

(51) Int. Cl.
*H04N 5/445* (2011.01)
*H04N 21/462* (2011.01)
*G06F 3/0484* (2013.01)
*H04N 21/478* (2011.01)
*G06F 3/0481* (2013.01)
*G06F 3/0482* (2013.01)

(56) References Cited

U.S. PATENT DOCUMENTS

| | | |
|---|---|---|
| 10,289,428 B2 | 5/2019 | Im et al. |
| 2002/0171770 A1 | 11/2002 | Wendt et al. |
| 2003/0214527 A1 | 11/2003 | Paul |
| 2006/0181645 A1* | 8/2006 | Sarika ............ H04N 21/4223 348/563 |
| 2012/0244839 A1* | 9/2012 | Shen ................ H04L 63/083 455/411 |
| 2013/0058019 A1 | 3/2013 | Lee et al. |
| 2016/0192011 A1 | 6/2016 | Toh et al. |
| 2017/0076634 A1* | 3/2017 | Hoss ................... G09B 23/30 |
| 2017/0148045 A1 | 5/2017 | Shin et al. |
| 2017/0332032 A1 | 11/2017 | Park |
| 2018/0139505 A1* | 5/2018 | Sirpal ............ H04N 21/4312 |
| 2018/0247440 A1* | 8/2018 | Heo ..................... G09G 5/14 |
| 2019/0146444 A1* | 5/2019 | Brown ............... G06F 3/0482 340/514 |

FOREIGN PATENT DOCUMENTS

| | | | |
|---|---|---|---|
| CN | 104767866 A | 7/2015 | |
| KR | 10-2001-0044861 A | 6/2001 | |
| KR | 10-2005-0112210 A | 11/2005 | |
| KR | 10-2011-0012923 A | 2/2011 | |
| KR | 10-2014-0135386 A | 11/2014 | |
| KR | 10-2015-0101356 A | 9/2015 | |
| KR | 10-1706942 B1 | 2/2017 | |
| KR | 10-2017-0128883 A | 11/2017 | |
| KR | 20180097921 A * | 9/2018 | ............ G09G 5/14 |
| WO | 2009099695 A1 | 8/2009 | |

OTHER PUBLICATIONS

Communication dated Jul. 24, 2020 from the European Patent Office in application No. 18895726.0.
International Search Report dated Mar. 15, 2019 issued by the International Searching Authority in counterpart International Application No. PCT/KR2018/014920 (PCT/ISA/210).
Written Opinion dated Mar. 15, 2019 issued by the International Searching Authority in counterpart International Application No. PCT/KR2018/014920 (PCT/ISA/237).
Communication dated Apr. 6, 2021, issued by the European Patent Office in European Application No. 20209603.8.
Communication dated Aug. 2, 2021 issued by the National Intellectual Property Administration of English P.R. China in Chinese Application No. 201880081855.8.

* cited by examiner

ELECTRONIC DEVICE AND DISPLAY METHOD THEREOF

TECHNICAL FIELD

The disclosure relates to an electronic device and a display method thereof, and more particularly, to a method of displaying a wallpaper of an electronic device through various methods.

BACKGROUND ART

In the past, the main function of a display device such as a TV is reproducing various broadcast contents. However, recently, there is also a case of using a display device for applying an aesthetic effect. For example, in case a display device does not reproduce a broadcast content, an aesthetic effect is being created by displaying a wallpaper like a work of art. However, in the past, a problem existed as a method of displaying a wallpaper and a method of setting a wallpaper were not specified.

DETAILED DESCRIPTION OF THE INVENTION

Technical Problem

The disclosure was devised for addressing the aforementioned problem, and relates to various methods of setting and displaying a wallpaper.

Technical Solution

An electronic device according to an embodiment of the disclosure for achieving the aforementioned purpose includes a display, and a processor for controlling the electronic device to operate in one of a wallpaper mode and a content mode. The processor is configured to, in the absence of a preset wallpaper, based on a first user command being input while the display operates in the content mode for reproducing a broadcast content, control the display to change and display the broadcast content to a first UI for entering the wallpaper mode, and in the absence of the preset wallpaper, based on a second user command being input while the display operates in the content mode, control the display to change and display the broadcast content to a wallpaper setting screen for setting a wallpaper.

Here, the processor may, based on a user command being input while the first UI is displayed, control the display to change and display the first UI to a wallpaper setting screen for setting a wallpaper.

Here, the processor may, in the presence of the preset wallpaper, based on a third user command being input while the first UI is displayed, control the display to change and display the first UI to the preset wallpaper.

Here, the first user command may be a command to turn off the power of the electronic device, and the processor may, based on a third user command not being input while the first UI is displayed, gradually decrease the size of the first UI.

Here, the processor may, based on the first UI disappearing, turn off the power of the electronic device.

Here, the size of the first UI in the absence of the preset wallpaper and the size of the first UI in the presence of the preset wallpaper may be different.

Here, the processor may, based on the first user command being input for greater than or equal to a preset number of times, turn off the power of the electronic device without displaying the first UI.

Here, the second user command may be a conversion command for converting the display to the wallpaper mode, and the processor may, in the presence of the preset wallpaper, based on the second user command being input, control the display to display the preset wallpaper.

Meanwhile, a display method of an electronic device operating in one of a wallpaper mode and a content mode according to another embodiment of the disclosure for achieving the aforementioned purpose includes the steps of, in the absence of a preset wallpaper, based on a first user command being input while the display operates in the content mode for reproducing a broadcast content, changing and displaying the broadcast content to a first UI for entering the wallpaper mode, and in the absence of the preset wallpaper, based on a second user command being input while the display operates in the content mode, changing and displaying the broadcast content to a wallpaper setting screen for setting a wallpaper.

Here, the display method may further include the step of, based on a user command being input while the first UI is displayed, changing and displaying the first UI to a wallpaper setting screen for setting a wallpaper.

Here, the step of changing and displaying to the first UI may further include the step of, in the presence of the preset wallpaper, based on a third user command being input while the first UI is displayed, changing and displaying the first UI to the preset wallpaper.

Here, the first user command may be a command to turn off the power of the electronic device, and the display method may further include the step of, based on a third user command not being input while the first UI is displayed, gradually decreasing the size of the first UI.

Here, the display method may further include the step of, based on the first UI disappearing, turning off the power of the electronic device.

Here, the size of the first UI in the absence of the preset wallpaper and the size of the first UI in the presence of the preset wallpaper may be different.

Here, the display method may further include the step of, based on the first user command being input for greater than or equal to a preset number of times, turning off the power of the electronic device without displaying the first UI.

Here, the second user command may be a conversion command for converting the display to the wallpaper mode, and the display method may further include the step of, in the presence of the preset wallpaper, based on the second user command being input, displaying the preset wallpaper.

According to the various embodiments of the disclosure as above, a user can set and display a wallpaper through various methods.

MODE FOR IMPLEMENTING THE INVENTION

Figure 1:
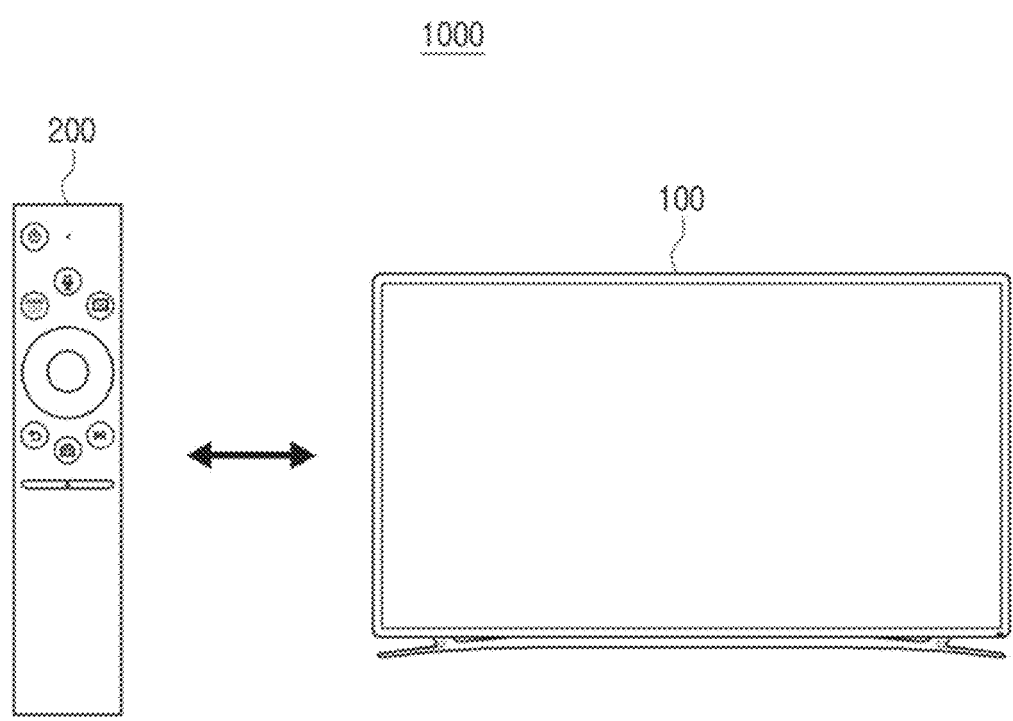
FIG. 1 is an exemplary diagram for illustrating an electronic device and a remote control device according to an embodiment of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Terms such as "first," "second" and the like may be used to describe various elements, but the terms are not intended to limit the elements. Such terms are used only to distinguish one element from another element.

Terms used in the disclosure are used just to explain specific embodiments, and are not intended to limit the scope of protection of the disclosure. Also, singular expressions include plural expressions, unless defined obviously differently in the context. Further, in this specification, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the embodiments of the disclosure, 'a module' or 'a part' may perform at least one function or operation, and may be implemented as hardware or software, or as a combination of hardware and software. Further, a plurality of 'modules' or 'parts' may be integrated into at least one module and implemented as at least one processor (not shown), excluding 'a module' or 'a part' that needs to be implemented as specific hardware.

Meanwhile, in the disclosure, a method for an electronic device to display various content screens while including a display will be described, but the disclosure is not limited thereto. That is, an electronic device may be constituted as a set-top box, or an over the top (OTT) device. In this case, an electronic device may transmit an image signal to an external display device, and it is obvious that an external display device that received an image signal can display various content screens. Hereinafter, for the convenience of explanation and understanding, the disclosure will describe a case wherein the electronic device 100 includes a display. However, as described above, the technical idea of the disclosure can obviously be applied to a case wherein the electronic device 100 does not include a display.

Meanwhile, an electronic device according to an embodiment of the disclosure may have a plurality of operation modes. Here, the plurality of operation modes may include a first operation mode and a wallpaper mode. The first operation mode which is one of the plurality of operation modes means a mode of displaying a general image. Specifically, the first operation mode is a mode of displaying a content stored in the electronic device in advance or broadcasting received from the outside by using the entire screen of the electronic device. While the mode is referred to as the first operation mode for the convenience of explanation, it may alternatively be referred to as a normal mode, a content mode, etc. Hereinafter, the mode will be referred to as a content mode in this specification.

Meanwhile, during the first operation mode, not only a general image is displayed, but a specific content object may be displayed together. Here, a specific content object may be an object including information on a general image, and also, an object including information on channels that can be viewed.

The second operation mode which is another operation mode of the electronic device may display a screen including a wallpaper image. For the convenience of explanation, the second operation mode may be referred to as an ambient mode, an ambience mode, a wallpaper image mode, a wallpaper mode, etc. Hereinafter, the mode will be referred to as a wallpaper mode in this specification.

Hereinafter, the disclosure will be described in detail with reference to the accompanying drawings.

FIG. 1 is an exemplary diagram for illustrating an electronic device and a remote control device according to an embodiment of the disclosure.

The electronic device 100 according to the disclosure may operate according to a user command input from a remote control device 200. For example, if a user command is input through a power-off button provided on the remote control device 200, the power of the electronic device 100 may be turned off. Alternatively, if a user command is input through a wallpaper mode conversion button provided on the remote control device 200, the electronic device 100 may be operated in the wallpaper mode.

Here, the electronic device 100 may be various devices including a display. For example, the electronic device 100 may be constituted as a TV, a smartphone, a tablet personal computer (PC), a mobile phone, a video phone, an e-book reader, a desktop PC, a laptop PC, a netbook computer, etc. As another example, the electronic device 100 may be a home appliance. A home appliance may include, for example, at least one of a television, a digital video disk (DVD) player, an audio, a refrigerator, an air conditioner, a cleaner, an oven, a microwave oven, a washing machine, an air purifier, a set-top box, a home automation control panel, a security control panel, a TV box (e.g.: Samsung Home-Sync™, Apple TV™, or Google TV™), a game console (e.g.: Xbox™, PlayStation™), an electronic dictionary, an electronic key, a camcorder, or an electronic photo frame.

The remote control device 200 is a device for controlling the electronic device 100. As illustrated in FIG. 1, the remote control device 200 may be a remote control for the electronic device 100 manufactured for controlling only the electronic device 100, but is not limited thereto. That is, it is obvious that the remote control device 200 can not only be a remote control for the electronic device 100, but also a user terminal device such as a smartphone, a tablet personal computer (PC), a desktop PC, a laptop PC, a netbook computer, etc., or a set-top box, and an over the top (OTT) device.

Figure 2:
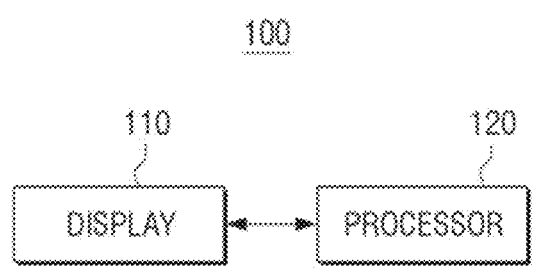
FIG. 2 is a block diagram illustrating a schematic configuration of an electronic device according to an embodiment of the disclosure.

FIG. 2 is a block diagram illustrating a schematic configuration of the electronic device 100 according to an embodiment of the disclosure.

The electronic device 100 includes a display 110 and a processor 120. The display 110 is a component for displaying image data. Here, image data may be a concept including various broadcast contents reproduced in the content mode and various wallpapers operating in the wallpaper mode, as described above. Specifically, while the electronic device 100 operates in the content mode, the display 110 may display an image content acquired from an external source (e.g., a broadcasting station, a server, a DVD, etc.). Alternatively, while the electronic device 100 operates in the wallpaper mode, the display 110 may display a set wallpaper.

The processor 120 controls the overall operations of the electronic device 100. Specifically, the processor 120 may set a wallpaper to be displayed by the display 110 in the wallpaper mode.

Here, if a preset wallpaper does not exist, and a first user command is input while the display 110 operates in the content mode fir reproducing a broadcast content, the processor 120 may control the display 110 to change and display the broadcast content that was being reproduced to a first UI for entering the wallpaper mode. Here, the first UI may be a UI screen for entering a wallpaper browser. Also, the first user command may be a command to turn off the power. Various examples of a command to turn off the power will be described below. Meanwhile, a wallpaper browser means a setting screen for setting a wallpaper.

Alternatively, if a preset wallpaper does not exist, and a second user command is input while the display 110 operates in the content mode for reproducing a broadcast content, the processor 120 may control the display 110 to change and display the broadcast content that was being reproduced to a wallpaper browser for setting a wallpaper. Here, the second user command may be a conversion command to convert the display 110 to the wallpaper mode.

Meanwhile, if a third user command is input while the first UI is displayed, the processor 120 may control the display 110 to change and display the first UI to the wallpaper browser.

That is, in case a preset wallpaper does not exist, if the first user command (the command to turn off the power) is input, the processor 120 may display the first UI for entering the wallpaper browser before turning off the power of the electronic device 100. Meanwhile, if the third user command is input while the first UI is displayed, the processor 120 may control the display 110 to display the wallpaper browser instead of turning off the power.

Meanwhile, if a preset wallpaper exists, and the third user command is input while the first UI is displayed, the processor 120 may control the display 110 to display the preset wallpaper. Here, the size of the first UI displayed in case a preset wallpaper exists and the size of the first UI displayed in case a preset wallpaper does not exist may be different.

Meanwhile, in case the third user command is not input while the first UI is displayed, the processor 120 may gradually decrease the size of the first UI. For example, the processor 120 may decrease the first UI through various methods such as reducing the first UI in the up and down directions, reducing the first UI in the left and right directions, reducing the first UI in the up, down, left, and right directions, or increasing the transparency, etc.

Meanwhile, if the third user command is not input while the first UI is displayed and the size of the first UI decreases and then the first UI disappears, the power of the electronic device 100 may be turned off.

Meanwhile, if a preset wallpaper exists, and the second user command is input, the processor 120 may control the display 110 to display the preset wallpaper.

Figure 3:
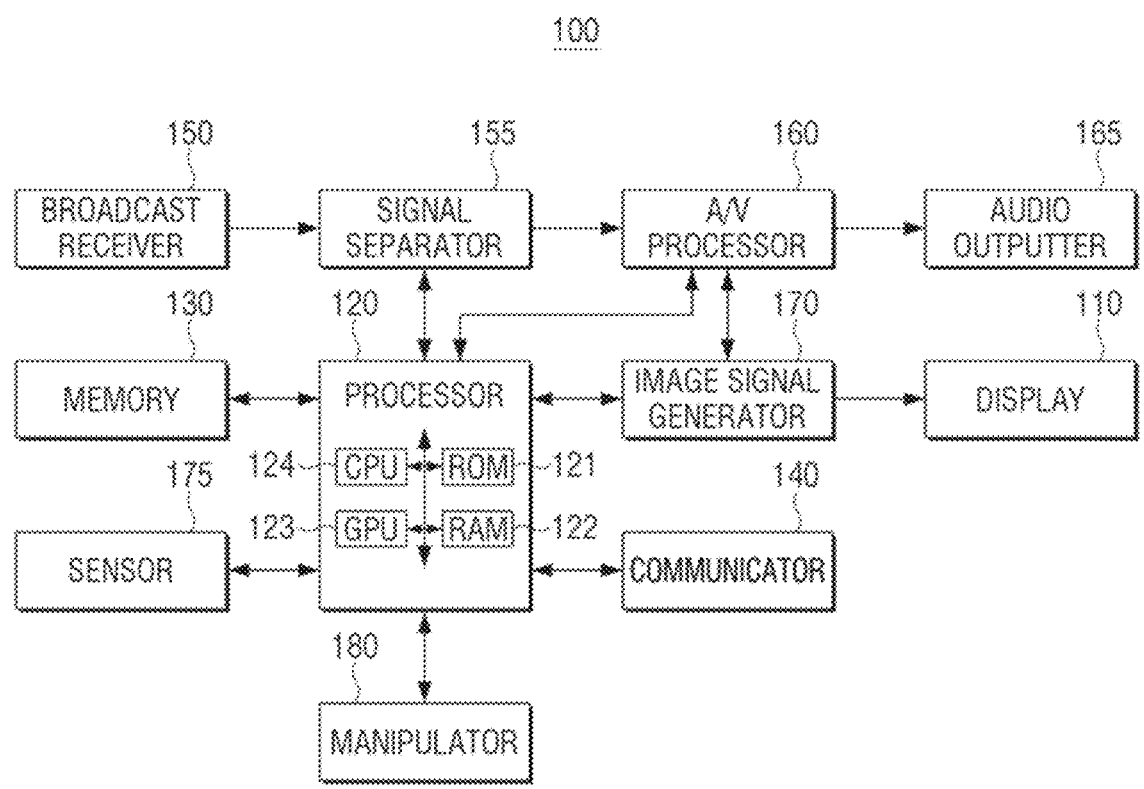
FIG. 3 is a block diagram illustrating a detailed configuration of an electronic device according to an embodiment of the disclosure.

FIG. 3 is a block diagram illustrating a detailed configuration of an electronic device according to an embodiment of the disclosure. Referring to FIG. 3, the electronic device 100 according to an embodiment of the disclosure may include a display 110, a processor 120, a memory 130, a communicator 140, a broadcast receiver 150, a signal separator 155, an A/V processor 160, an audio outputter 165, an image signal generator 170, a sensor 175, and a manipulator 180.

However, the disclosure is not limited to the aforementioned components, and some components may be added, omitted, or merged depending on needs. For example, the processor 120 may be a component including the signal separator 155, the AN processor 160, and the image signal generator 170. In this case, the processor 120 may perform the functions and the operations of the A/V processor 160 and the image signal generator 170 that will be described below. The communicator 140 is a component performing communication with various types of external devices according to various types of communication methods. The communicator 140 may include a Wi-Fi chip and a Bluetooth chip. The processor 120 may perform communication with various types of external devices by using the communicator 140. Specifically, the communicator 140 may receive a control command or a user interaction from a control terminal device (e.g., a smartphone, a remote control) that can control the electronic device 100.

Alternatively, the communicator 140 may receive various data from the server 200. For example, the communicator 140 may acquire wallpaper information, weather information, etc. through communication with the server 200. The processor 120 may generate a wallpaper image by using the weather information acquired through the communicator 140.

Other than the above, depending on embodiments, the communicator 140 may further include a USB port to which a USB connector can be connected, or various external input ports for being connected to various external terminals such as a headset, a mouse, or a LAN, etc., a DMB chip that receives a digital multimedia broadcasting (DMB) signal and processes the signal, etc., although not illustrated in FIG. 2.

The display 110 displays images. Such a display 110 may be implemented as displays in various forms such as a liquid crystal display (LCD), a plasma display panel (PDP), etc. In the display 110, driving circuits that may be implemented in forms such as an a-si TFT, a low temperature poly silicon (LTPS) TFT, and an organic TFT (OTFT), a backlight unit, etc. may also be included together. Meanwhile, the display 110 may be combined with a touch detection sensor and implemented as a touch screen.

The display 110 includes a backlight. Here, the backlight is a point light source consisting of a plurality of light sources, and it supports local dimming.

Here, light sources constituting the backlight may consist of a cold cathode fluorescent lamp (CCFL) or a light emitting diode (LED). Hereinafter, it will be illustrated and described that the backlight consists of a light emitting diode and a light emitting diode driving circuit, but in actual implementation, the backlight may be implemented as components other than an LED. Also, a plurality of light sources constituting such a backlight may be arranged in various forms, and various local dimming technologies may be applied. For example, the backlight may be a direct type backlight wherein a plurality of light sources are arranged in the form of a matrix and are uniformly arranged on an entire liquid crystal screen. In this case, the backlight may operate by full-array local dimming or direct local dimming. Here, full-array local diming is a dimming method wherein overall light sources are evenly arranged behind an LCD screen, and adjustment of the luminance of each light source is performed. Meanwhile, direct local dimming is a dimming method which is similar to the full-array local dimming method, but adjustment of the luminance of each light source is performed with a smaller number of light sources.

Also, the backlight may be an edge type backlight wherein a plurality of light sources are arranged only in the rim portion of an LCD. In this case, the backlight may operate by edge-lit local dimming. Here, in the edge-lit local dimming, a plurality of light sources are arranged only in the edge portion of a panel, and it is also possible that a plurality of light sources are arranged only in the left/right portions, or arranged in the up/down portions, or arranged in the left/right/up/down portions.

In addition, the display 110 may be driven at a first frequency (e.g., 120 Hz or 240 Hz) while it operates in the content mode. Also, the display 110 may be driven at a second frequency (e.g., 60 Hz) lower than the first frequency while it operates in the wallpaper mode. That is, by driving the display 110 at a low frequency while it operates in the wallpaper mode, power consumption can be minimized.

The broadcast receiver 150 receives broadcasting from a broadcasting station or a satellite via wire or wirelessly and demodulates the broadcasting. Specifically, the broadcast receiver 150 may receive a transmission stream through an antenna or a cable and demodulate the transmission stream, and output a digital transmission stream signal.

The signal separator 155 separates a transmission stream signal provided at the broadcast receiver 150 into an image signal, an audio signal, and an additional information signal. Then, the signal separator 155 transmits the image signal and the audio signal to the A/V processor 160.

The A/V processor 160 performs signal processing such as video decoding, video scaling, audio decoding, etc. for the image signal and the audio signal input from the broadcast receiver 150 and the memory 130. Then, the AN processor 160 outputs the image signal to the image signal generator 170, and outputs the audio signal to the audio outputter 165. Here, the image output through the image signal generator 170 may be a content image by the content mode.

In contrast, in the case of storing the received image and audio signals in the memory 130, the AN processor 160 may output the image and the audio in compressed forms to the memory 130.

The audio outputter 165 converts the audio signal output from the A/V processor 160 into sound and outputs the sound through a speaker (not shown), or outputs the sound to an external device connected through an external output terminal (not shown).

The image signal generator 170 generates a graphic user interface (GUI) to be provided to a user. Then, the image signal generator 170 adds the generated GUI to the image output from the A/V processor 160. Then, the image signal generator 170 provides an image signal corresponding to the image to which the GUI was added to the display 110. Accordingly, the display 110 displays various kinds of information provided at the electronic device 100 and the image transmitted from the image signal generator 170.

Then, the image signal generator 170 may process a content screen generated by the processor 120 and output the screen. Here, in case the image generated by the image signal generator 170 includes a plurality of layers, the image signal generator 170 may output the plurality of layers as they are, or synthesize (or merge) the plurality of layers and provide the layers to the display 110.

The memory 130 stores various data and programs for controlling the electronic device 100. Also, the memory 130 may be provided with an image content wherein an image and audio are compressed from the A/V processor 160 and store the image content, and output the stored image content to the A/V processor 160 according to control by the processor 120. In particular, the memory 130 may store data for a wallpaper image.

Meanwhile, the memory 130 may be implemented as a hard disc, a non-volatile memory, a volatile memory, etc.

The manipulator 180 is implemented as a touch screen, a touch pad, a key button, a keypad, etc., and provides a user manipulation of the electronic device 100. In this embodiment, an example wherein a control command is input through the manipulator 180 provided on the electronic device 100 was described, but the manipulator 180 may receive a user manipulation from an external control device (e.g., a remote control).

The sensor 175 may detect a user interaction. That is, a user interaction may not only be received from an external device as described above, but may also be detected from the sensor 175.

According to another embodiment of the disclosure, the sensor 175 may be a touch sensor detecting a touch input of a user.

According to still another embodiment of the disclosure, the sensor 175 may be an illuminance sensor. The processor 120 may acquire an ambient illuminance value through the illuminance sensor, and adjust the illuminance of the wallpaper according to the acquired illuminance.

Other than the above, the sensor 175 may further include various sensors such as an IR sensor, an ultrasonic sensor, an RF sensor, etc.

The processor 120 controls the overall operations of the electronic device 100. Specifically, the processor 120 may control the image signal generator 170 and the display 110 such that an image according to a control command input through the manipulator 180 is displayed during the first operation mode.

The processor 120 may be implemented in the form of a system on chip (SoC) including a ROM 121, a RAM 122, a graphic processing unit (GPU) 123, a CPU 124, and a bus. In this case, the ROM 121, the RAM 122, the graphic processing unit (GPU) 123, and the CPU 124 may be connected with one another through the bus.

The CPU 124 accesses the memory 130, and performs booting by using the operation system (O/S) stored in the memory 130. Then, the CPU 124 may perform various operations by using various kinds of programs, contents, data, etc. stored in the memory 130.

The ROM 121 stores a set of instructions, etc. for system booting. When a turn-on instruction is input and power is supplied, the CPU 124 copies the O/S stored in the memory 130 in the RAM 122 according to the instruction stored in the ROM 121, and boots the system by executing the O/S. When booting is completed, the CPU 124 copies the various kinds of programs stored in the memory 130 in the RAM 122, and performs various kinds of operations by executing the programs copied in the RAM 122.

When booting of the electronic device 100 is completed, the GPU 123 may generate a screen including various objects such as icons, images, texts, etc. Specifically, in case the electronic device 100 operates in the wallpaper mode, the GPU 123 may generate a wallpaper including graphic objects in the wallpaper image. Here, a screen including various objects generated at the GPU 123 may be output through the image signal generator 170, as described above.

Meanwhile, such a GPU may be constituted as a separate component like the image signal generator 170, or it may be implemented as a component like an SoC combined with a CPU inside the processor 120.

Also, the processor 120 may be implemented as a separate component distinguished from the ROM, the RAM, the GPU, etc., and may be interlocked with other processors and memories.

Hereinafter, the various embodiments of the disclosure will be described with reference to FIGS. 4A to 11B. Unless there is a special circumstance, description will be made by dividing the operations of the electronic device 100 in a case wherein the wallpaper of the electronic device 100 is not set and in a case wherein the wallpaper of the electronic device 100 is set.

FIGS. 4A to 4D are exemplary diagrams for illustrating various methods of setting a wallpaper in a wallpaper mode according to an embodiment of the disclosure.

Figure 4A:
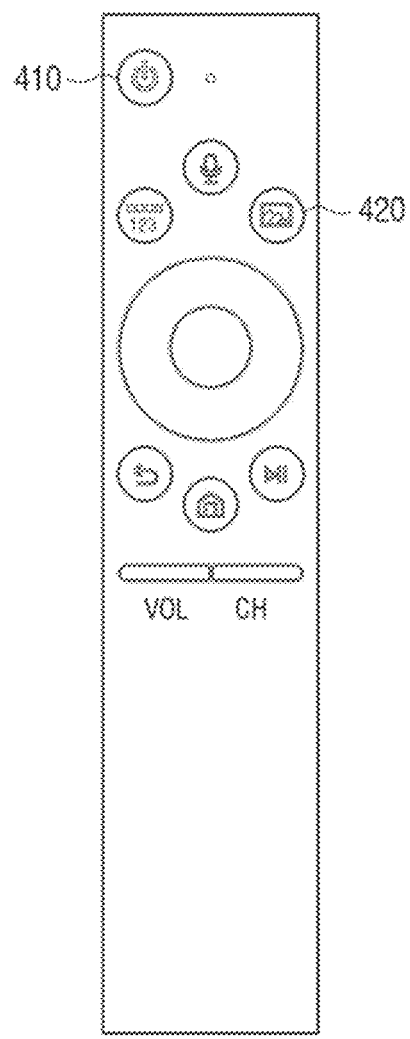
FIG. 4A is an exemplary diagram for illustrating various methods of setting a wallpaper in a wallpaper mode according to an embodiment of the disclosure.

As illustrated in FIG. 4A, the electronic device 100 may set a wallpaper by the remote control device 200. Specifically, if a user command is input through the power button 410 or the wallpaper button 420 of the remote control device 200, the electronic device 100 may display various UIs for setting or displaying a wallpaper.

Figure 4B:
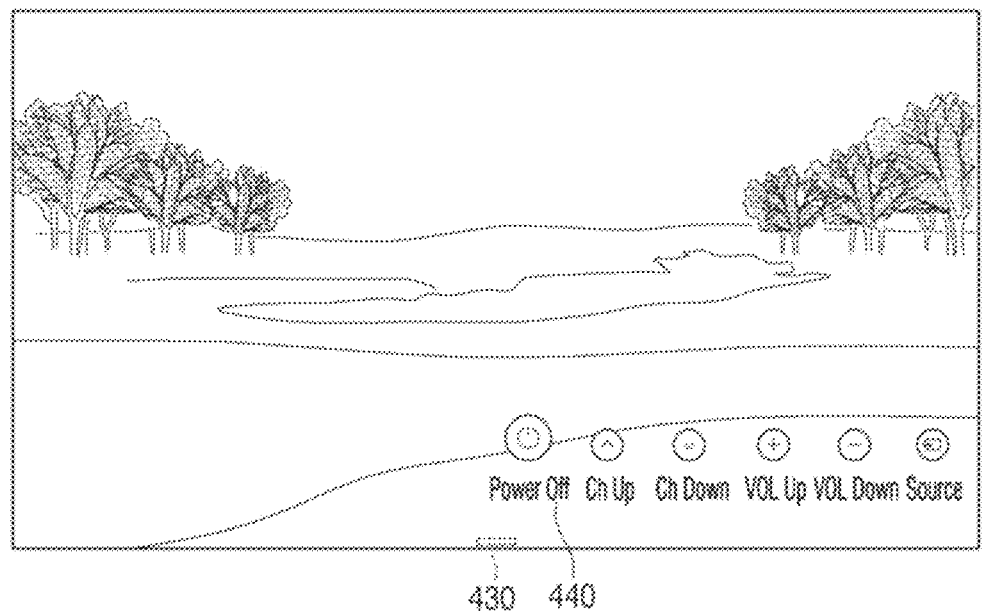
FIG. 4B is an exemplary diagram for illustrating various methods of setting a wallpaper in a wallpaper mode according to an embodiment of the disclosure.

Meanwhile, as illustrated in HG. 4B, a wallpaper may be set through the button 430 provided on the electronic device 100. For example, if a user command of pushing the button 430 short is input, the electronic device 100 may display an OSD including the power icon 440 as illustrated in FIG. 4B. Alternatively, in the case of pushing the button 430 long, the electronic device 100 may perform the same function as the power button 410 of the remote control device 200. However, the disclosure is not limited thereto, and in the case of pushing the button 430 long, the electronic device 100 can obviously perform the same function as the wallpaper button 420 of the remote control device 200.

Figure 4C:
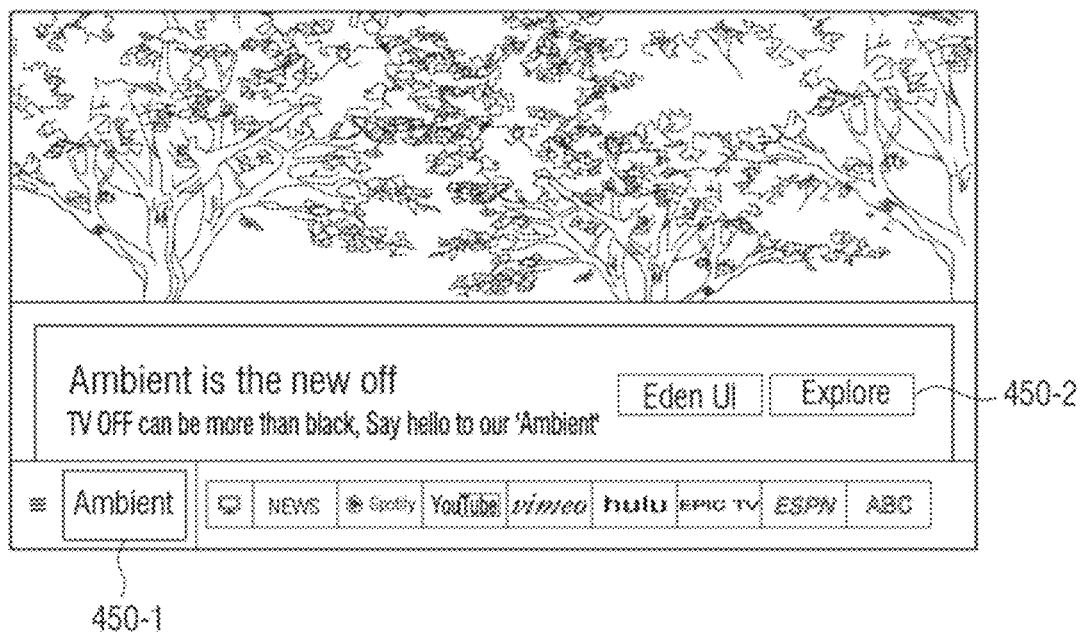
FIG. 4C is an exemplary diagram for illustrating various methods of setting a wallpaper in a wallpaper mode according to an embodiment of the disclosure.
Figure 4D:
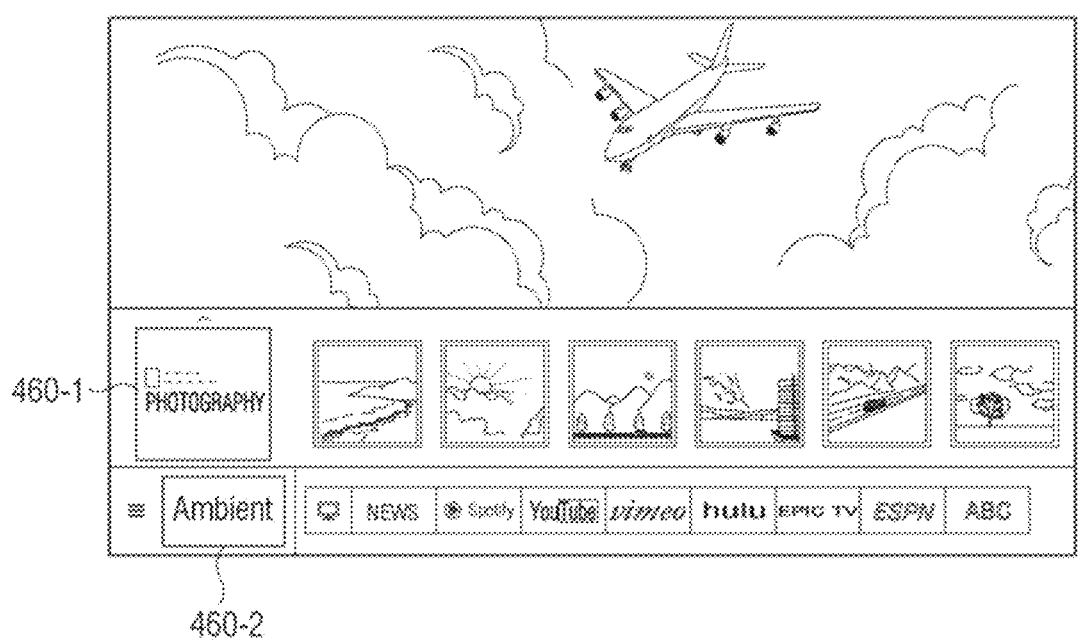
FIG. 4D is an exemplary diagram for illustrating various methods of setting a wallpaper in a wallpaper mode according to an embodiment of the disclosure.

Meanwhile, as illustrated in FIG. 4C and FIG. 4D, the electronic device 100 may display a UI for setting a wallpaper, and when a user command is input through icons 450-1, 450-2, 460-1, 460-2 included in the UI, the electronic device 100 may set a wallpaper. Here, FIG. 4C illustrates an example of a UI screen in case a wallpaper is not set, and FIG. 4D illustrates an example of a UI screen in case a wallpaper is set.

Meanwhile, the various buttons or icons included in a UI described in FIGS. 4A to 4D may be buttons/icons related to the power turning-on/turning-off functions, or buttons/icons related to the wallpaper displaying/setting functions. Specifically, buttons/icons related to the power turning-on/turning-off functions may be the power button 410 of the remote control device, the ODS power icon 440 displayed when the button 430 of the electronic device 100 is pushed short, and an operation by the electronic device 100 of pushing the button 430 long. Meanwhile, buttons/icons related to the wallpaper displaying/setting functions may be the wallpaper button 420 of the remote control device 200 and an operation of displaying a UI for setting a wallpaper, and the icons 450-1, 450-2, 460-1, 460-2 included in the UI.

FIGS. 5A to 5D are exemplary diagrams for illustrating a method of setting a wallpaper in case a preset wallpaper does not exist according to an embodiment of the disclosure.

Figure 5A:
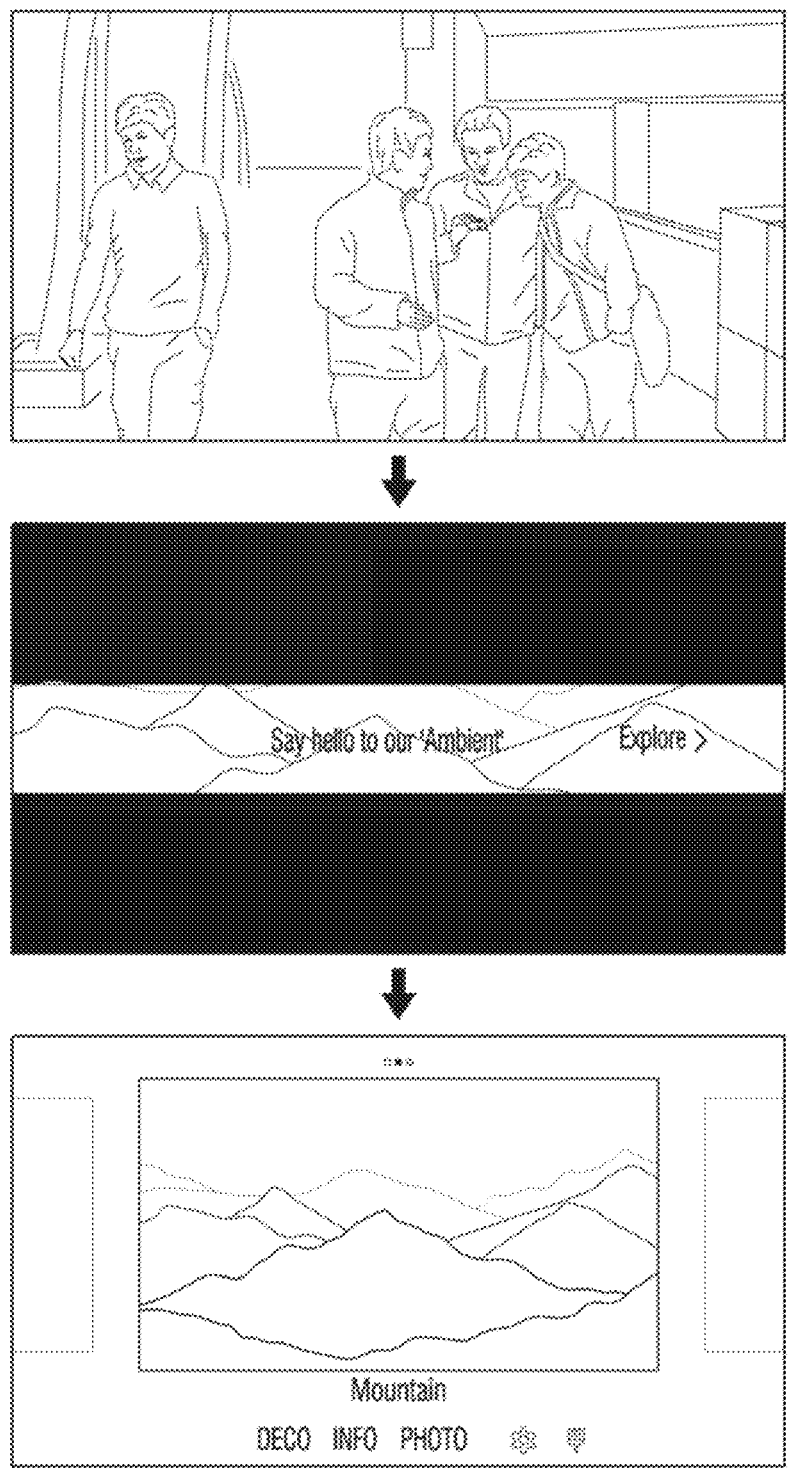
FIG. 5A is an exemplary diagram for illustrating a method of setting a wallpaper in case a preset wallpaper does not exist according to an embodiment of the disclosure.

FIG. 5A is an exemplary diagram for illustrating a method of displaying a wallpaper browser in case a command to turn off the power was input while a broadcast content was reproduced in the content mode.

Specifically, as illustrated in FIG. 5A, if a command to turn off the power is input while the electronic device 100 is displaying a content, the electronic device 100 may display a first UI as indicated in the center portion of FIG. 5A. Here, the command to turn off the power may be an input through the power button of the remote control device 200 or an input through the OSD displayed on the electronic device 100, etc., as described above.

Meanwhile, the first UI may be displayed in various ways. For example, if a command to turn of the power is input, the electronic device 100 may change a broadcast content to a black screen, and change and display the black screen to the first UI. Here, methods of changing a broadcast content to a black screen may be diverse. As an example, the electronic device 100 may extend a black screen from the end portion of the upper end and the end portion of the lower end of the display 110 to the center direction (here, the center direction is determined based on the end portion of the upper end and the end portion of the lower end of the display 110. Alternatively, the center direction may mean the vicinity of the center point of the display 110) and change the entire display 110 to the black screen. Alternatively, the electronic device 100 may extend a black screen from the end portion of the left end and the end portion of the right end of the display 110 to the center direction (here, the center direction is determined based on the end portion of the left end and the end portion of the right end of the display 110. Alternatively, the center direction may mean the vicinity of the center point of the display 110) and change the entire display 110 to the black screen. Or, the electronic device 100 may gradually increase (or decrease) the opacity (or transparency) of a broadcast content and gradually change the broadcast content to a black screen.

Meanwhile, methods of displaying a black screen as the first UI may also be diverse. For example, a black screen may be changed to the first UI by a method which is opposite to the method by which a broadcast content was changed to a black screen. For example, the electronic, device 100 may extend and display the first UI from the center portion of the display 110 to the up and down directions, or extend and display the first UI from the center portion of the display 110 to the left and right directions. Alternatively, the electronic device 100 may display the first UI by gradually decreasing (or increasing) the transparency (or opacity) of the first UI.

Meanwhile, in case the third user command was input while the first UI was displayed, the electronic device 100 may display the wallpaper browser as illustrated in the lower end of FIG. 5A. Here, the types of the third user command may be diverse. For example, the third user command may be a specific button (the button in the right direction, the check button, etc.) of the remote control device 200, or a specific user command through the first UI. Alternatively, the third user command may be any one of all user commands input into the electronic device 100. That is, while the first UI is displayed, if a user command is input, the electronic device 100 may display the wallpaper browser regardless of the type of the user command.

Meanwhile, in case the third user command is not input while the first UI is displayed, the electronic device 100 may decrease the size of the first UI. Specifically, the size of the first UI may be decreased by the same method as the method by which a broadcast content is changed and displayed to a black screen. That is, in case the third user command is not input while the first UI is displayed, the electronic device 100 may extend a black screen from the end portion of the upper end and the end portion of the lower end of the first UI to the center direction (here, the center direction is determined based on the end portion of the upper end and the end portion of the lower end of the first UI. Alternatively, the center direction may mean the vicinity of the center point of the first UI) and decrease the size of the first UI. Alternatively, the electronic device 100 may extend a black screen from the end portion of the left end and the end portion of the right end of the first UI to the center direction (here, the center direction is determined based on the end portion of the left end and the end portion of the right end of the first UI. Alternatively, the center direction may mean the vicinity of the center point of the first UI) and decrease the size of the first UI. Or, the electronic device 100 may gradually increase (or decrease) the opacity (or transparency) of the first UI and gradually change the first UI to a black screen. If the first UI is changed to a black screen by the method as above, the power of the electronic device 100 may be turned off.

Meanwhile, in case a specific condition is satisfied, the electronic device 100 may not display the first UI even if a command to turn off the power is input. For example, in case a command to turn off the power was input, and the first UI was displayed, but the third user command was not input, and thus a state wherein the power of the electronic device was turned off without change was repeated for a preset number of times (e.g., five times), if a command to turn off the power is input exceeding a preset number of times, the electronic device 100 may turn off the power of the electronic device 100 immediately without displaying the first UI. Specifically, if the electronic device 100 is continuously turned off for a preset number of times according to the above condition, the electronic device 100 may not display the first UI. For example, in case a command to turn off the power was continuously input into the electronic device 100, and the first UI was displayed, but the third user command was not input and the electronic device was turned off, if the sixth command to turn off the power is input, the electronic device 100 may turn off the power of the electronic device 100 without displaying the first UI.

Alternatively, in case a preset wallpaper exists, if a command to turn off the power is input, the electronic device 100 may turn off the power of the electronic device 100 without displaying, the first UI.

Figure 5B:
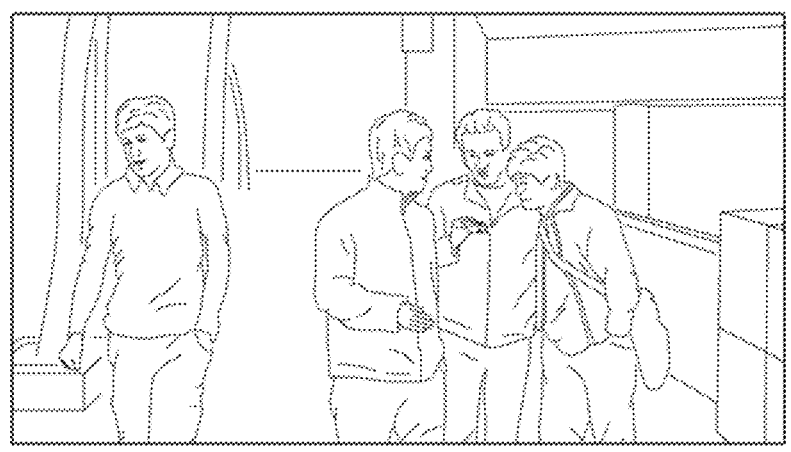
FIG. 5B is an exemplary diagram for illustrating a method of setting a wallpaper in case a preset wallpaper does not exist according to an embodiment of the disclosure.
Figure 5B:
Figure 5B:
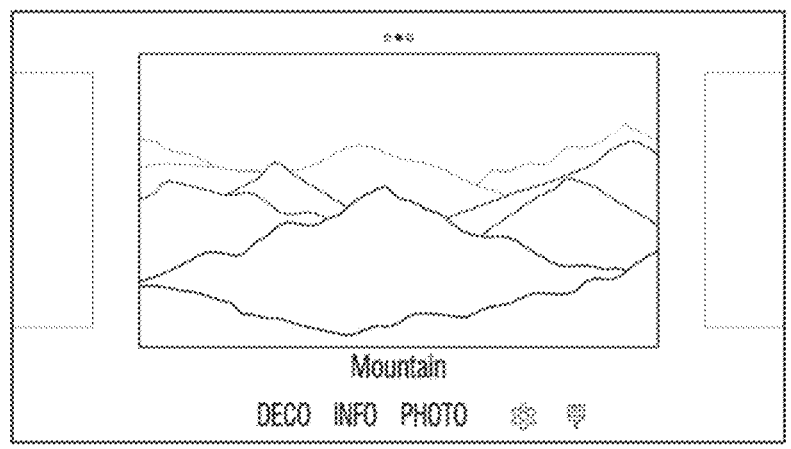

FIG. 5B is an exemplary diagram for illustrating a method for the electronic device 100 to display a wallpaper browser in case a command to set a wallpaper is input while a broadcast content is being reproduced in the content mode.

As illustrated in FIG. 5B, if a command to set a wallpaper is input while a broadcast content is being reproduced, the electronic device 100 may change the broadcast content to a wallpaper browser immediately. Here, the command to set a wallpaper may be the wallpaper button 420 of the remote control device 200 and an operation of displaying a UI for setting a wallpaper, and icons 450-1, 450-2, 460-1, 460-2 included in the UI, as described above.

Figure 5C:
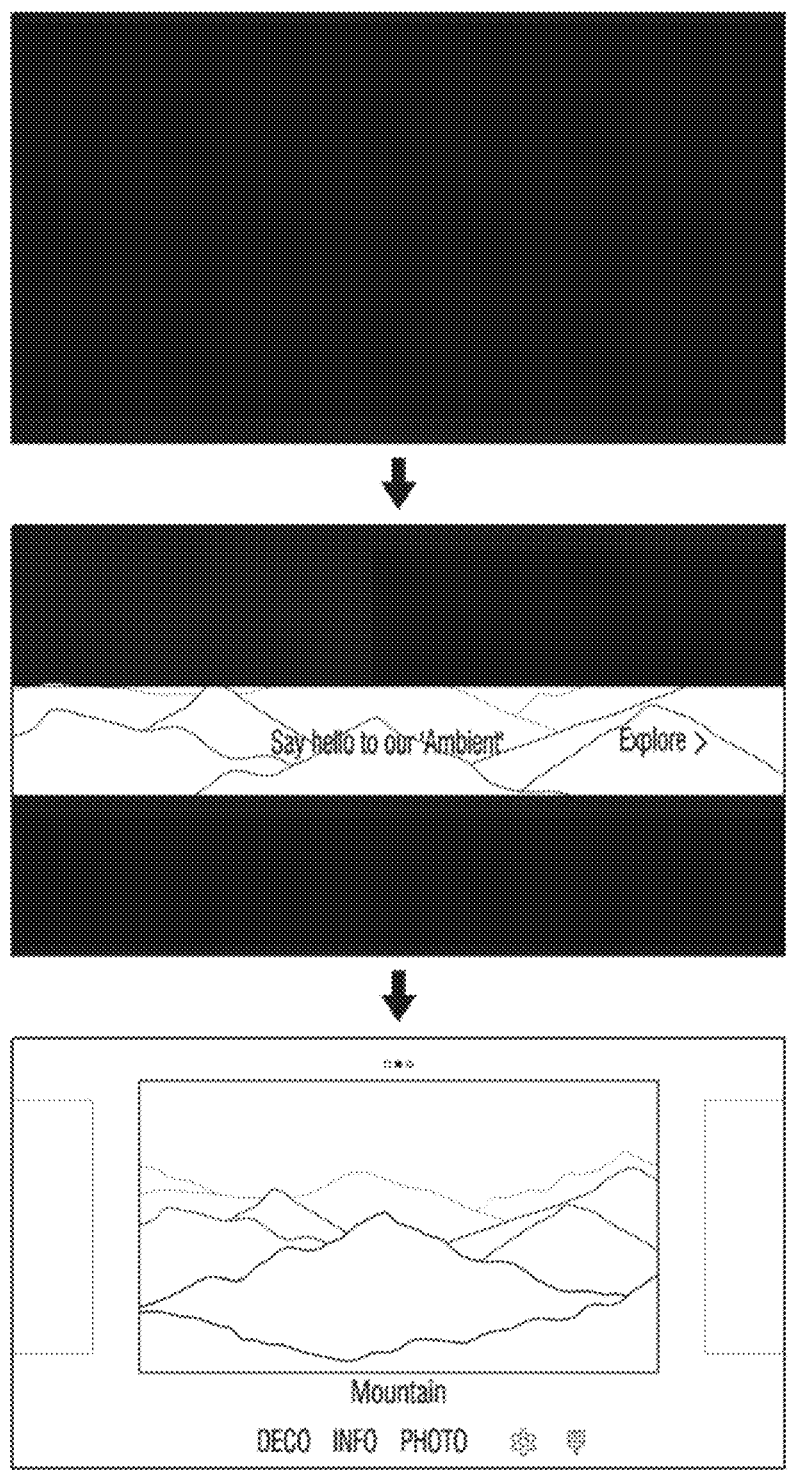
FIG. 5C is an exemplary diagram for illustrating a method of setting a wallpaper in case a preset wallpaper does not exist according to an embodiment of the disclosure.

FIG. 5C is an exemplary diagram for illustrating a method of displaying a wallpaper browser in case a command to set a wallpaper is input while the power of the electronic device 100 is turned off. In this case, if a command to set a wallpaper is input, the electronic device 100 may display the first UI, as illustrated ire FIG. 5C. Like in the case of FIG. 5A, if the third user command is input while the first UI is displayed, the electronic device 100 may display a wallpaper browser.

However, the disclosure is not limited to the case of FIG. 5C, and in case a command to set a wallpaper is input while the power of the electronic device 100 is turned off, the electronic device 100 can obviously display a wallpaper browser immediately without displaying the first UI.

Figure 5D:
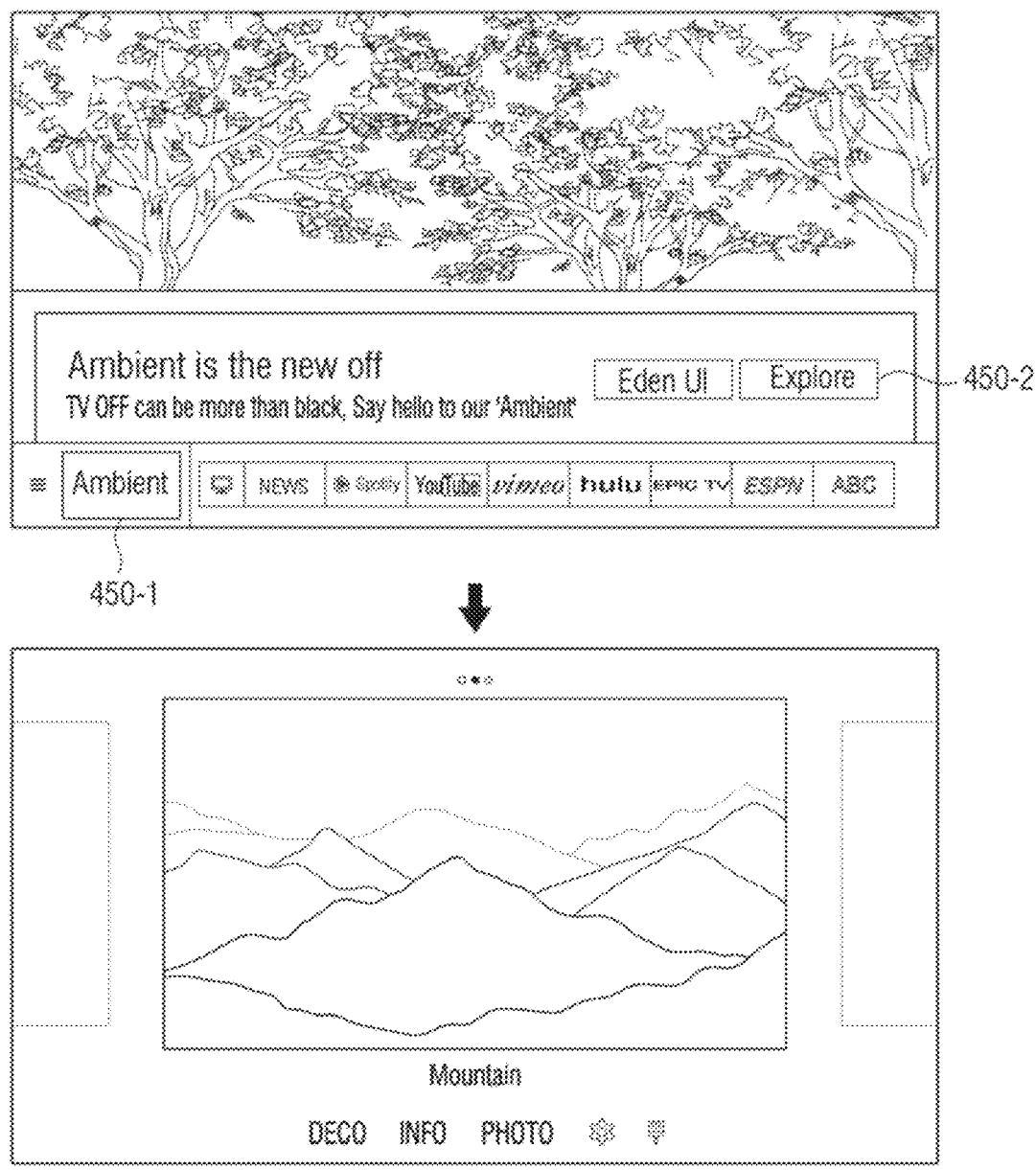
FIG. 5D is an exemplary diagram for illustrating a method of setting a wallpaper in case a preset wallpaper does not exist according to an embodiment of the disclosure.

FIG. 5D is an exemplary diagram for illustrating a method of displaying a wallpaper browser through a UI for setting a wallpaper.

Specifically, as illustrated in FIG. 5D, if a user command is input while a broadcast content is being reproduced, the electronic device 100 may display a UI for setting a wallpaper. Here, if a user command is input through the wallpaper setting icons 450-1, 450-2, the electronic device 100 may display a wallpaper browser as illustrated in the lower end of FIG. 5D.

Figure 6A:
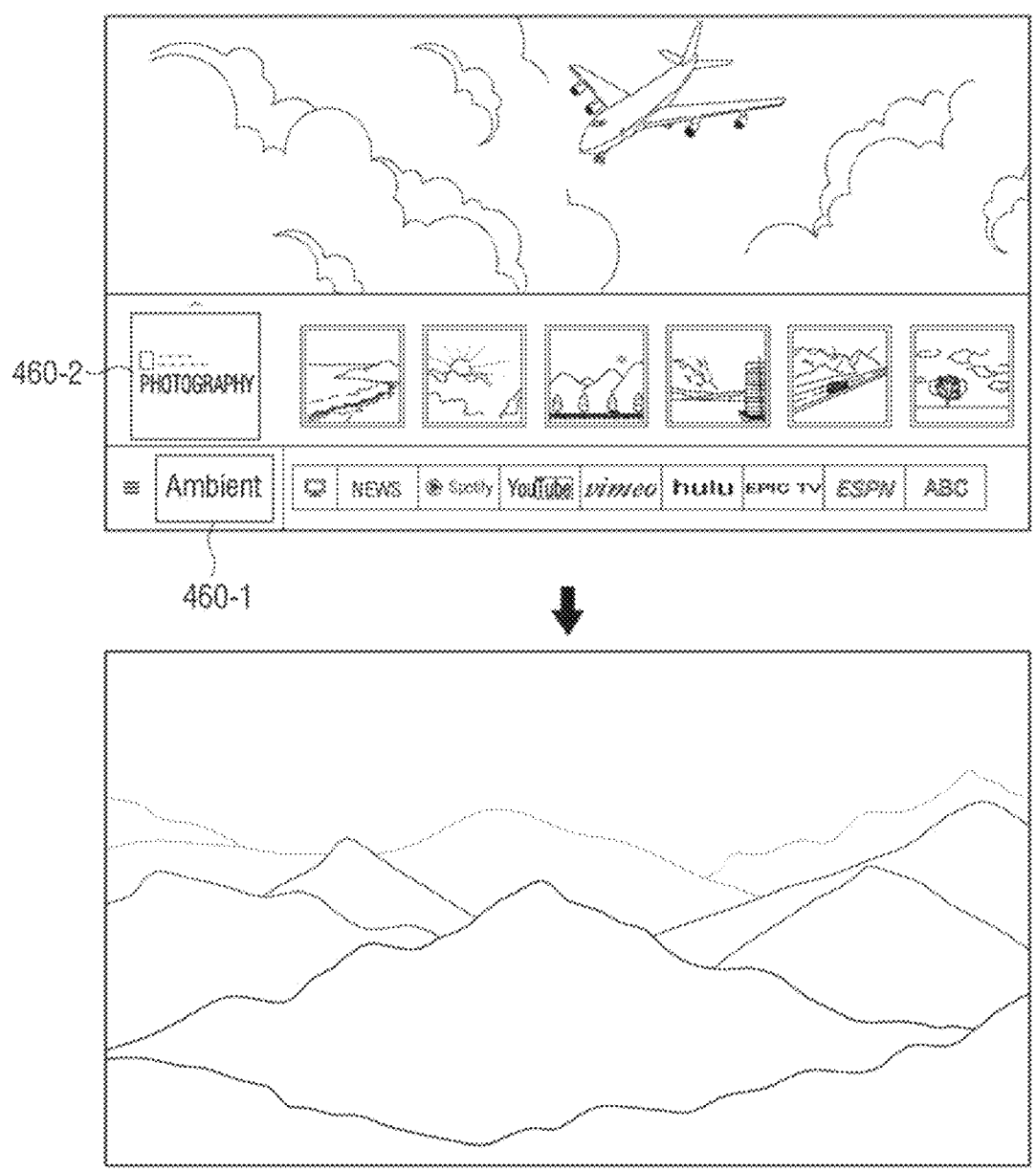
FIG. 6A is an exemplary diagram for illustrating a method of displaying a wallpaper in case a preset wallpaper exists according to an embodiment of the disclosure.
Figure 6B:
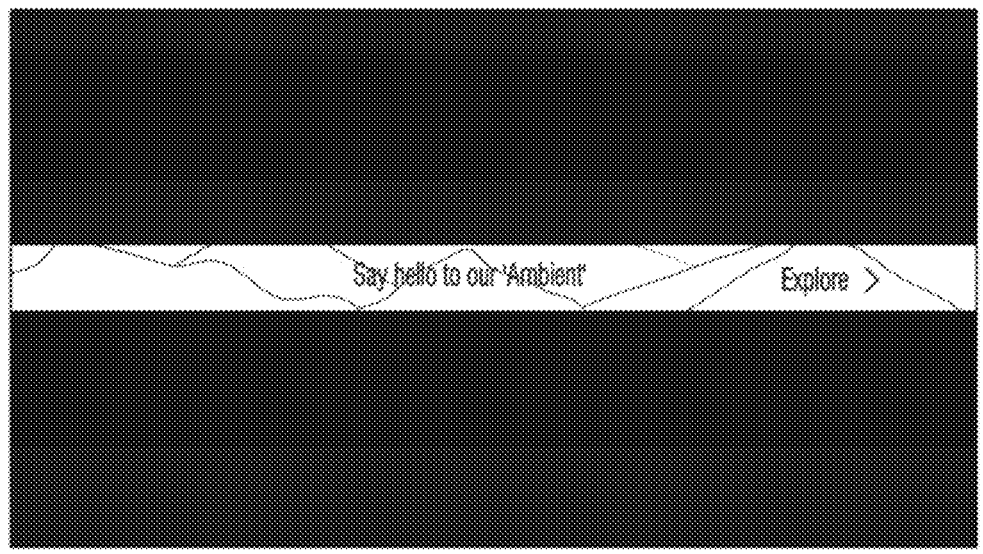
FIG. 6B is an exemplary diagram for illustrating a method of displaying a wallpaper in case a preset wallpaper exists according to an embodiment of the disclosure.

FIGS. 6A and 6B are exemplary diagrams for illustrating a method of displaying a wallpaper in case a preset wallpaper exists according to an embodiment of the disclosure.

Specifically, as illustrated in FIG. 6A, if a user command is input through the icons 460-1, 460-2 included in the UI for setting a wallpaper, the electronic device 100 may set a wallpaper. Here, if a user command is input through the icons 460-1, 460-2 included in the UI, the electronic device 100 may display a preset wallpaper.

Meanwhile, if a user command selecting a different wallpaper thumbnail displayed on the UI for setting a wallpaper is input, the electronic device 100 can obviously display a wallpaper corresponding to the selected thumbnail instead of the preset wallpaper.

Also, in FIG. 6A, a method of displaying a wallpaper through a UI for setting a wallpaper was described, but the same idea can obviously be applied to a case wherein a different command to set a wallpaper is input. For example, if the wallpaper button 420 of the remote control device 200 is input, the electronic device 100 can obviously display a preset wallpaper.

FIG. 6B is an exemplary diagram for illustrating a case wherein a command to turn off the power is input. As illustrated in FIG. 6B, if a command to turn off the power is input while a preset wallpaper exists, the electronic device 100 may display the first UI. Meanwhile, the size of the first UI displayed in this case may be different from the size of the first UI in case a preset wallpaper does not exist. For example, the size of the first UI in case a preset wallpaper exists may be smaller than the size of the first UI in case a preset wallpaper does not exist (refer to FIG. 5A and FIG. 6B). However, the disclosure is not limited thereto, and it is obvious that, according to various methods for distinguishing the first UI in case a preset wallpaper exists and the first UI in case a preset wallpaper does not exist, the first UI in each case can be distinguished. For example, in case a preset wallpaper exists, the first UI may include a portion of the preset wallpaper. That is, the electronic device 100 may display the first UI to which a preset wallpaper was added on the first UI in case a preset wallpaper does not exist.

Figure 7A:
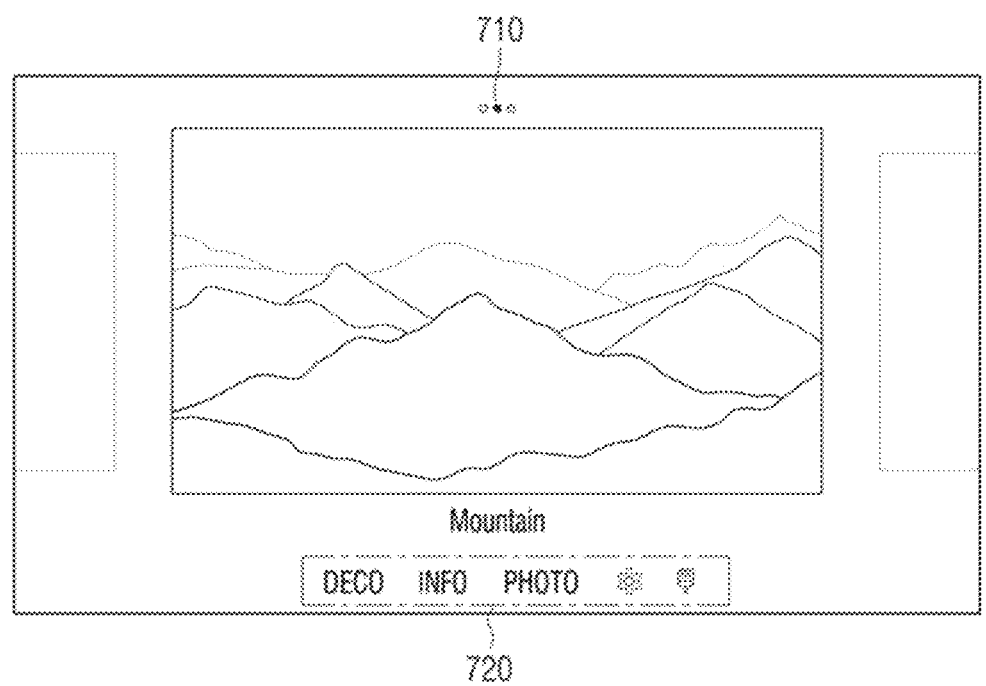
FIG. 7A is an exemplary diagram for illustrating a method of setting a wallpaper browser and a wallpaper in case a preset wallpaper does not exist according to an embodiment of the disclosure.
Figure 7B:
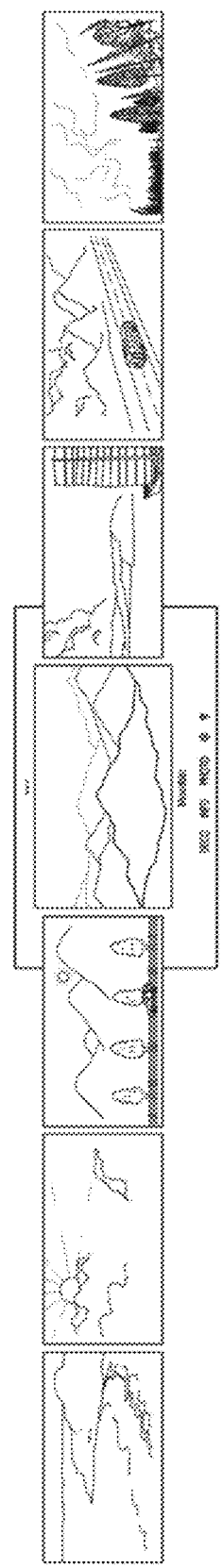
FIG. 7B is an exemplary diagram for illustrating a method of setting a wallpaper browser and a wallpaper in case a preset wallpaper does not exist according to an embodiment of the disclosure.

FIGS. 7A and 7B are exemplary diagrams for illustrating a method of setting a wallpaper browser and a wallpaper in case a preset wallpaper does not exist according to an embodiment of the disclosure.

As illustrated in FIG. 7A, the wallpaper browser may include an upper end icon 710 and a lower end icon 720. Here, the upper end icon 710 is an icon that can browse all of the entire wallpapers of the wallpaper category included in the lower end icon, and the lower end icon may include the wallpaper category, setting, wallpaper icons, etc. The wallpaper category may include category icons related to decoration wallpapers, information providing wallpapers, and photograph wallpapers.

Here, in case the wallpaper is moved through the lower end icon 720, the electronic device 100 may browse wallpapers in the list included in the current wallpaper category. Also, in case the wallpaper is moved through the upper end icon 710, the electronic device 100 may browse the wallpaper category.

For example, as illustrated in FIG. 7B, in case the electronic device 100 includes seven wallpaper categories, the electronic device 100 may browse the categories through the upper end icon 710, and may browse wallpapers included in a specific category through the lower end icon 720.

Figure 8A:
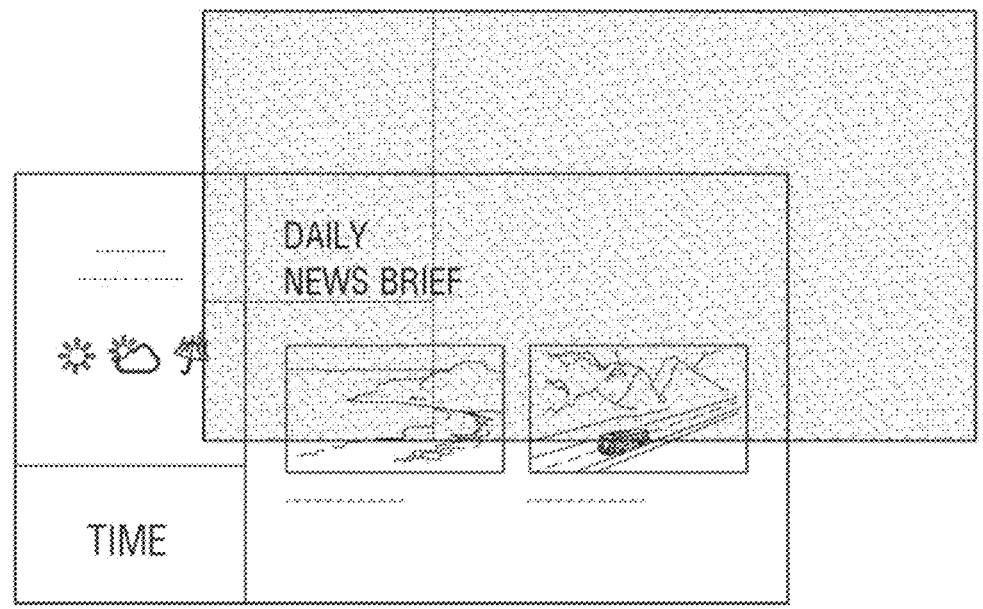
FIG. 8A is an exemplary diagram for illustrating a method of displaying a wallpaper in case a wallpaper includes information according to an embodiment of the disclosure.
Figure 8A:
Figure 8A:
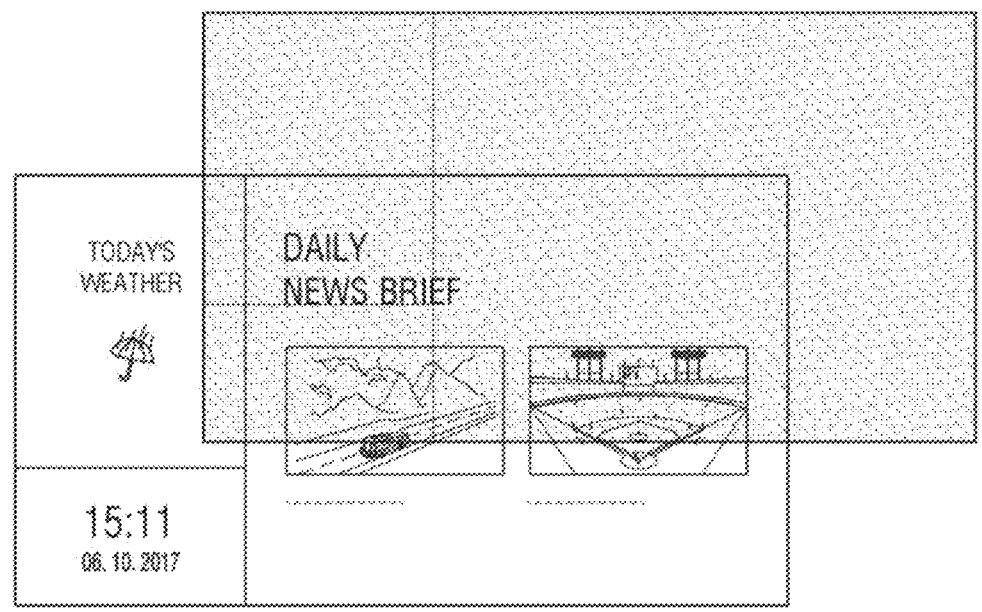
Figure 8B:
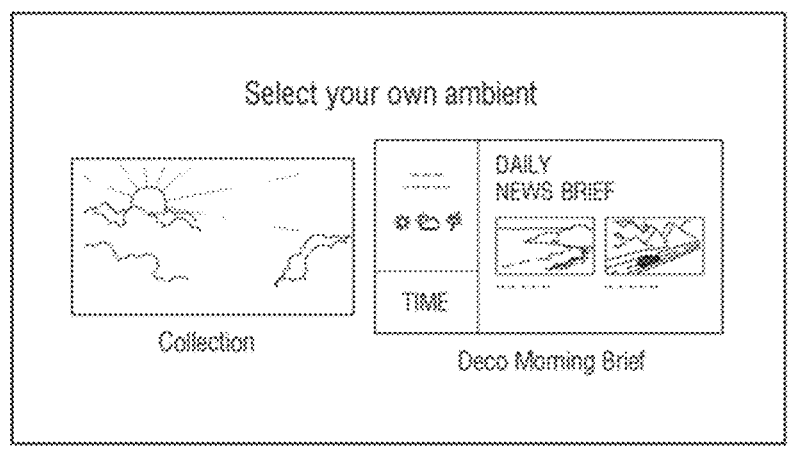
FIG. 8B is an exemplary diagram for illustrating a method of displaying a wallpaper in case a wallpaper includes information according to an embodiment of the disclosure.
Figure 8B:
Figure 8B:
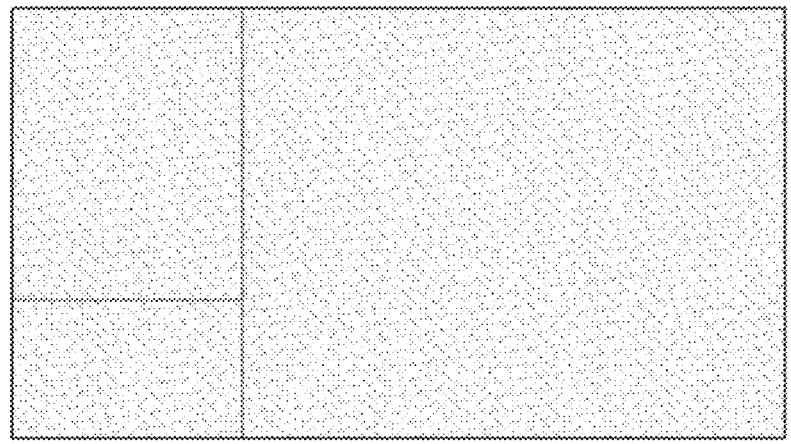
Figure 8B:
Figure 8B:
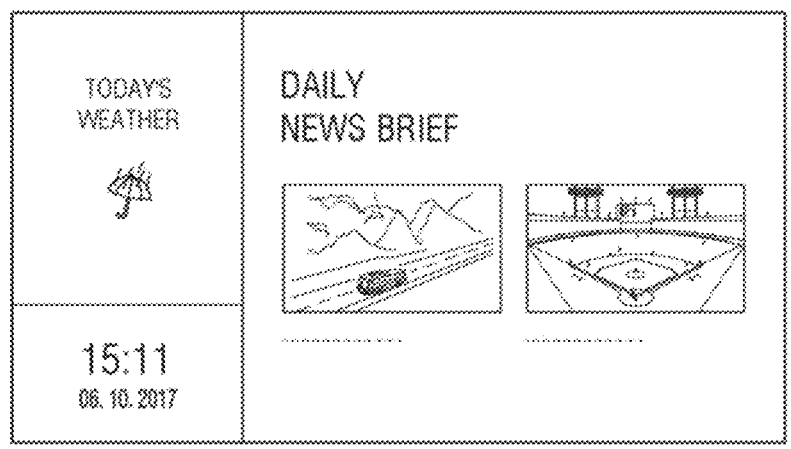

FIGS. 8A and 8B are exemplary diagrams for illustrating a method of displaying a wallpaper in case a wallpaper includes information according to an embodiment of the disclosure.

As illustrated in FIG. 8A, the electronic device 100 may generate a plurality of layers for displaying a wallpaper. That is, the electronic device 100 may generate and display a wallpaper layer for displaying a wallpaper and a graphic object layer for displaying a graphic object.

In case a thumbnail is set at the wallpaper browser, the electronic device 100 may display a wallpaper corresponding to the thumbnail. Here, in case the wallpaper corresponding to the thumbnail includes changed information, the electronic device 100 may change and display a fixed wallpaper to a wallpaper including changed information.

Specifically, as illustrated in FIG. 8A, the electronic device 100 may select a graphic object layer including a fixed graphic object including weather information, time information, and news information. The fixed graphic object may be a graphic object that is always used when displaying a corresponding thumbnail.

Here, when a user command for selecting the thumbnail is input, the electronic device 100 may change and display the weather information, time information, and news information as illustrated in the lower end of FIG. 8A.

Specifically, as illustrated in FIG. 8B, the wallpaper browser may display a plurality of thumbnails including a plurality of fixed graphic objects. Here, the plurality of thumbnails are preset thumbnails, and the thumbnails do not include changed information.

If a user command selecting the thumbnail on the right side is input, the electronic device 100 may remove the fixed graphic object of the graphic object layer, and display the changed graphic object. That is, the electronic device 100 may change the content of the graphic object displayed on the graphic object layer, while maintaining the wallpaper displayed on the wallpaper layer.

Figure 9:
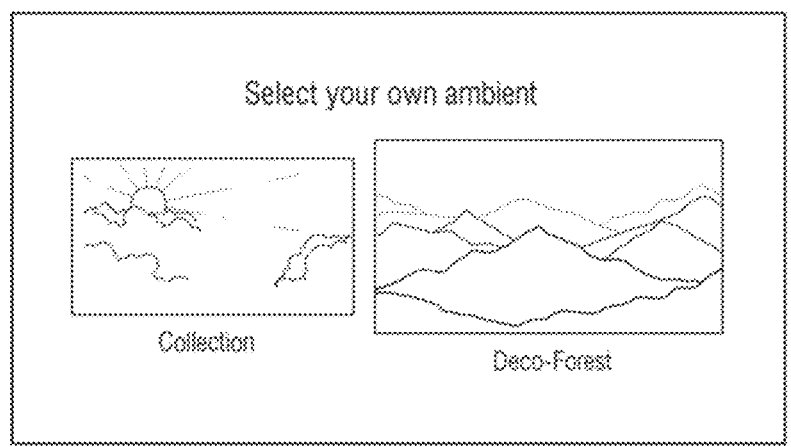
FIG. 9 is an exemplary diagram for illustrating a method of displaying a wallpaper browser and a wallpaper in case a wallpaper according to an embodiment of the disclosure is an image.
Figure 9:
Figure 9:
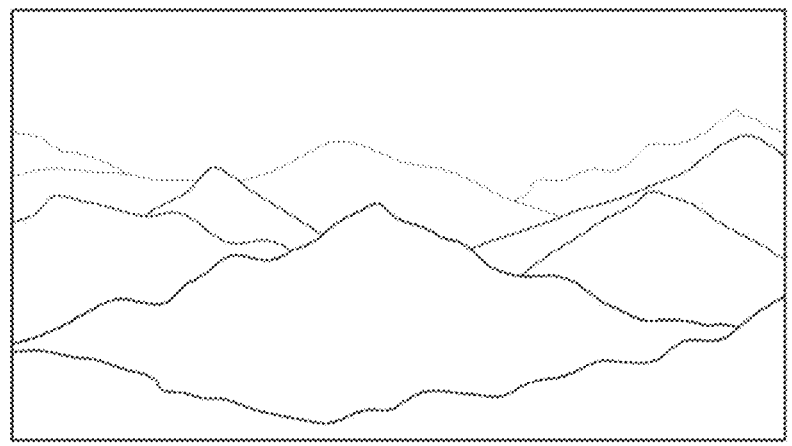
Figure 9:
Figure 9:
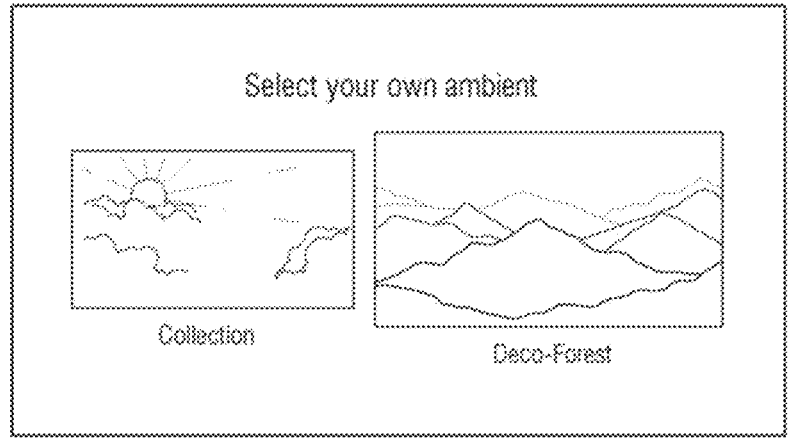
Figure 10:
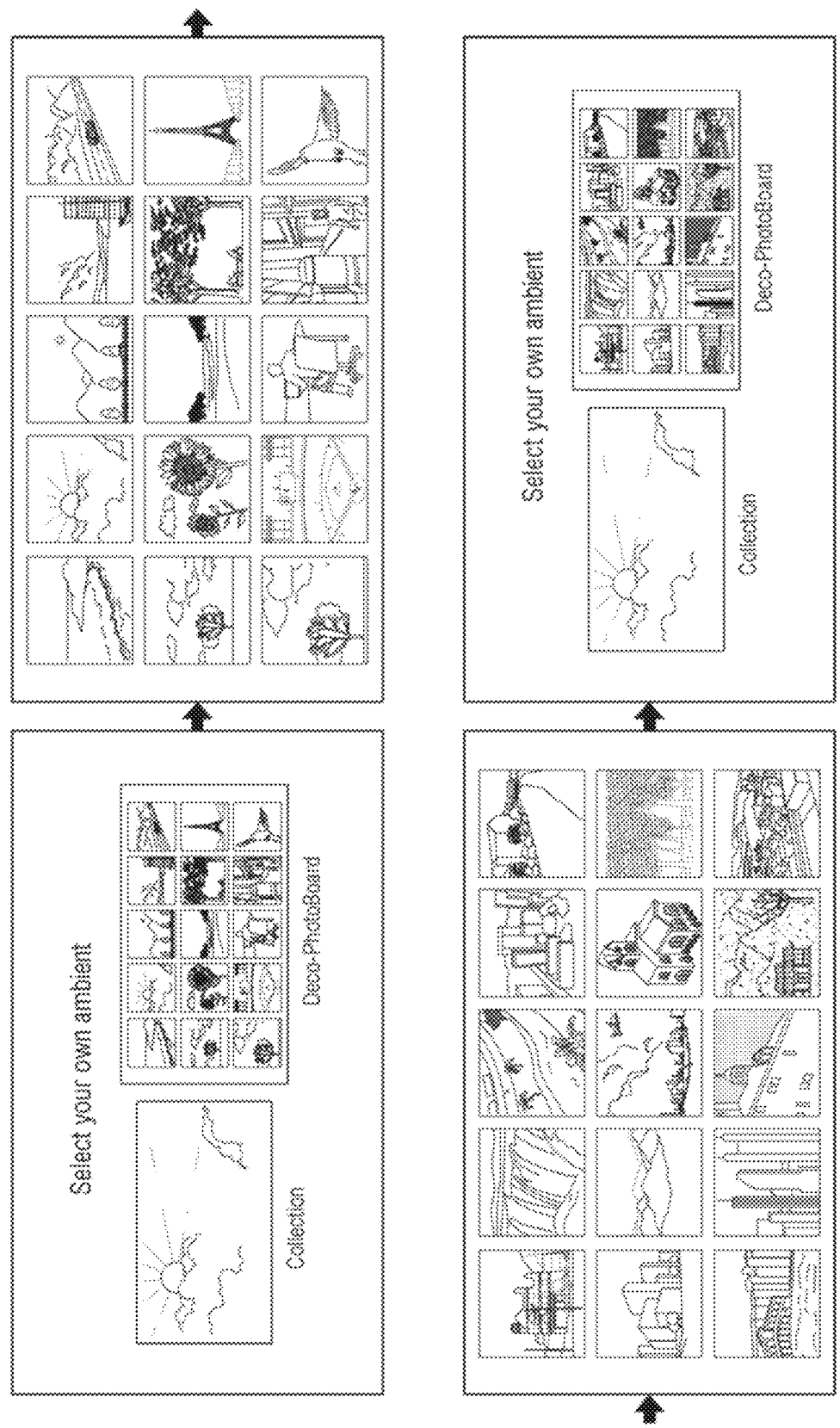
FIG. 10 is an exemplary diagram for illustrating a method of displaying a wallpaper browser and a wallpaper in case a wallpaper according to an embodiment of the disclosure is an image.

FIGS. 9 and 10 are exemplary diagrams for illustrating a method of displaying a wallpaper browser and, a wallpaper in case a wallpaper according to an embodiment of the disclosure is an image.

FIG. 9 is an exemplary diagram for illustrating a method of changing a wallpaper through a wallpaper browser. As illustrated in FIG. 9, if a user command selecting the thumbnail on the right side (deco-forest) among the thumbnails included in the graphic object layer is input, the electronic device 100 may display a wallpaper corresponding to the deco thumbnail. Here, the displayed wallpaper may be the representative wallpaper of the corresponding category. As illustrated in the middle part of FIG. 9, if a user command for changing a wallpaper is input while a wallpaper is displayed on the display 110 of the electronic device 100, the electronic device 100 may change the wallpaper according to the user command. Meanwhile, if a user command for moving to a wallpaper browser is input, the electronic device 100 may display a wallpaper browser including a thumbnail including the representative wallpaper of the corresponding category.

That is, in the case of FIG. 9, even when a wallpaper is changed and then changed to a wallpaper browser for displaying a thumbnail, the thumbnail may include a representative changed screen which is not the changed wallpaper.

However, the disclosure is not limited to the aforementioned embodiment, and as illustrated in FIG. 10, the electronic device 100 can obviously change a thumbnail to a changed wallpaper.

That is, if the electronic device 100 displays a wallpaper browser, and selects one of the thumbnails included in the wallpaper browser, the electronic device 100 may display a wallpaper corresponding to the selected thumbnail. If the wallpaper is changed and then a user command for changing to a wallpaper browser is input, the electronic device 100 may display a wallpaper browser including a thumbnail corresponding to the changed wallpaper.

Figure 11A:
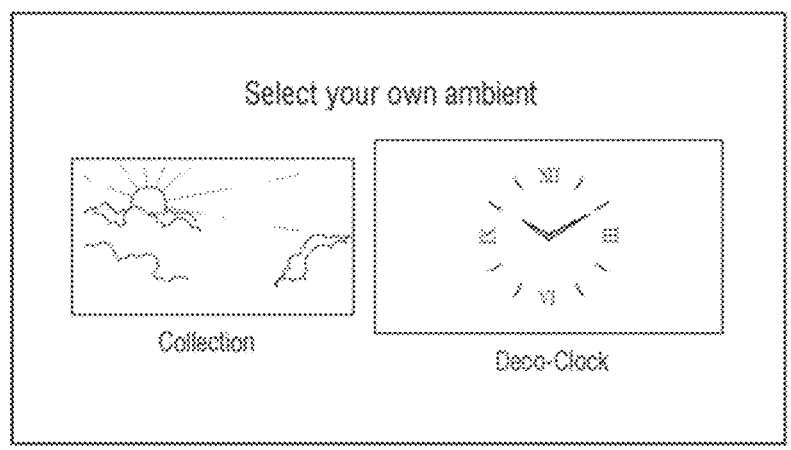
FIG. 11A is an exemplary diagram for illustrating a method of displaying a wallpaper in case a wallpaper according to an embodiment of the disclosure includes a clock UI.
Figure 11A:
Figure 11A:
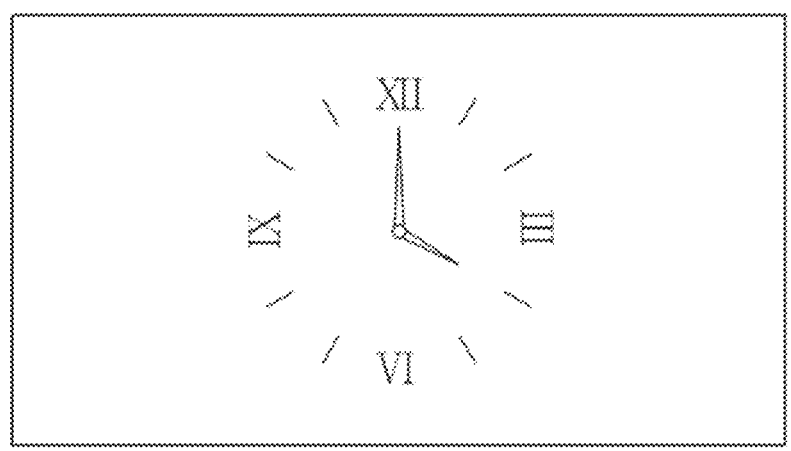
Figure 11A:
Figure 11A:
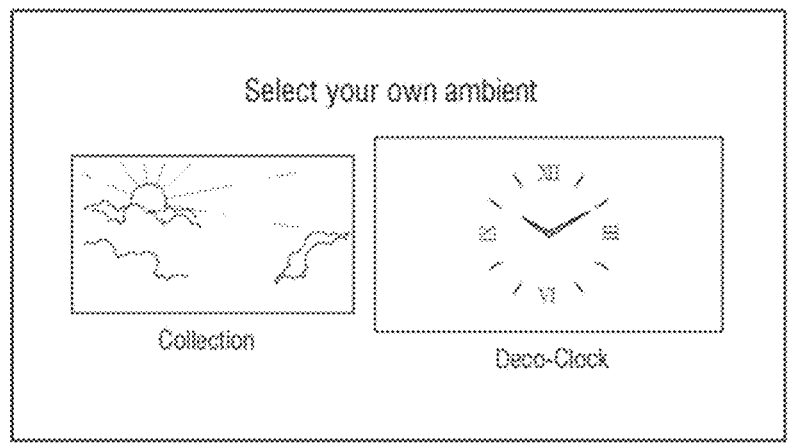
Figure 11B:
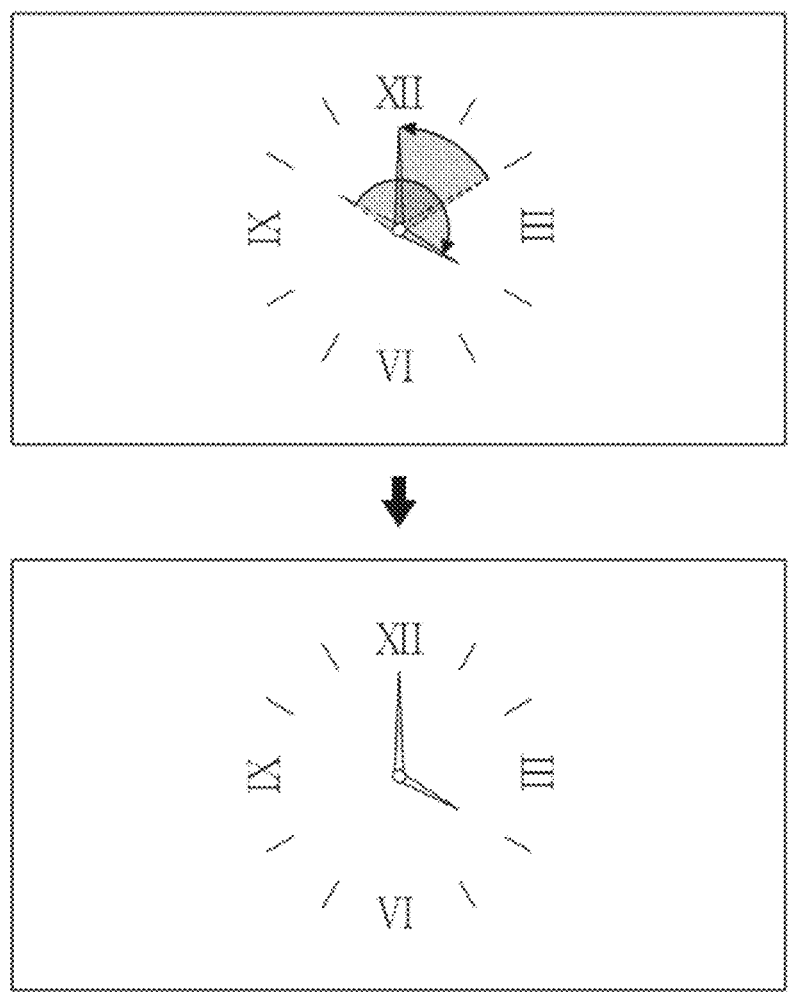
FIG. 11B is an exemplary diagram for illustrating a method of displaying a wallpaper in case a wallpaper according to an embodiment of the disclosure includes a clock UI.

FIG. 11A and FIG. 11B are exemplary diagrams for illustrating a method of displaying a wallpaper in case a wallpaper according to an embodiment of the disclosure includes a clock UI.

As described in FIG. 8A and FIG. 8B, a thumbnail displays a fixed wallpaper, and when the thumbnail is selected, the electronic device 100 may change and display the fixed wallpaper to an actual wallpaper.

Specifically, in the case of FIG. 11A, it is an exemplary diagram for illustrating an embodiment in case a wallpaper includes a clock object. A fixed object included in a thumbnail may be, for example, a clock object indicating 10:10. Here, when a user command for displaying the thumbnail including the clock object as a wallpaper is input, the electronic device 100 may display the clock object indicating the current time 4 o'clock. Also, when a user command for changing from a wallpaper to a wallpaper browser is input, the electronic device 100 may display a wallpaper browser. Here, the fixed clock object included in the wallpaper browser may be a clock object indicating 10:10.

Meanwhile, a fixed object may be changed to a wallpaper including an actual object together with various effects. For example, as illustrated in FIG. 11B, the electronic device 100 may display a clock object including the current time information together with an effect of rotating the minute hand and the hour hand of the clock object. Here, the rotating directions of the hour hand and the minute hand may be clockwise directions or counter-clockwise directions according to the locations of the hour hand and the minute hand of the fixed object and the locations of the hour hand and the minute hand corresponding to the current time. That is, the electronic device 100 may rotate the hour hand or the minute hand in directions wherein the amount of rotations of the hour hand or the minute hand is the smallest.

Specifically, in the case of the hour hand as illustrated in FIG. 11B, the rotating direction of rotating from 10 o'clock to 4 o'clock may be a clockwise direction, and in the case of the minute hand, the direction of rotating from 10 minutes to 00 minutes may be a counter-clockwise direction.

Figure 12:
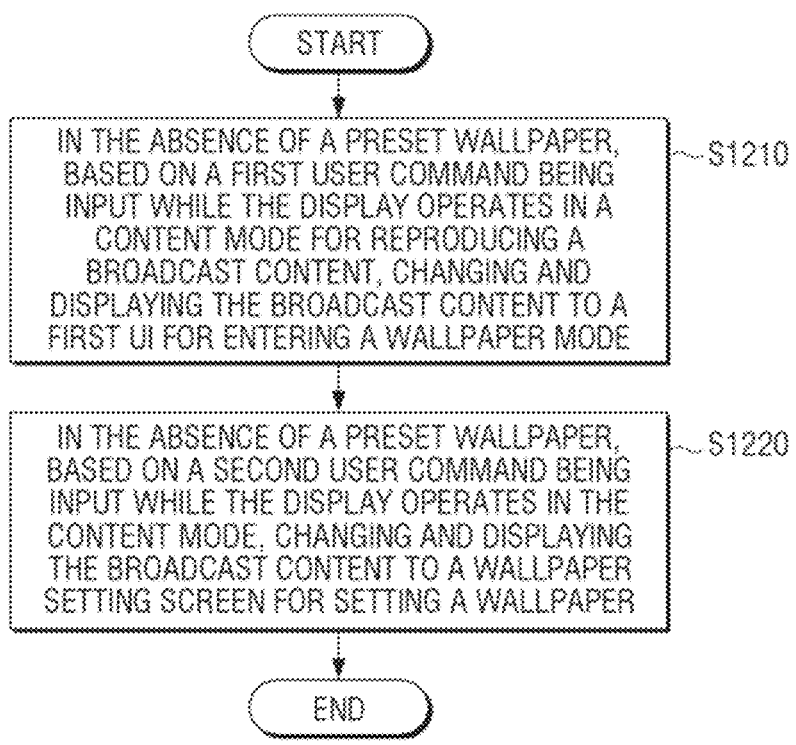
FIG. 12 is a flow chart for illustrating a display method of an electronic device according to an embodiment of the disclosure.

FIG. 12 is a flow chart for illustrating a display method of an electronic device according to an embodiment of the disclosure.

First, in case a preset wallpaper does not exist, if a first user command is input while the display operates in a content mode for reproducing a broadcast content, the electronic device 100 may change and display the broadcast content to a first UI for entering a wallpaper mode at operation S1210. As described above, the first user command may be a command to turn off the power.

Also, in case a preset wallpaper does not exist, if a second user command is input while the display operates in a content mode for reproducing a broadcast content, the electronic device 100 may change and display the broadcast content to a wallpaper setting screen for setting a wallpaper at operation S1220. Here, the second user command may be a user command related to setting/displaying of a wallpaper.

Meanwhile, devices (e.g.: modules or the electronic device 100) or methods (e.g.: operations) according to the various embodiments of the disclosure may be performed, for example, by at least one computer (e.g.: the processor 120) executing instructions included in at least one program among programs maintained in computer-readable storage media.

In case instructions as above are executed by a computer (e.g.: the processor 130), the at least one computer may perform functions corresponding to the instructions. Here, a storage medium that is readable by a computer mar be, for example, the memory 110.

Programs may be included, for example, in computer-readable storage media such as a hard disc, a floppy disc, magnetic media (e.g.: a magnetic tape), optical media (e.g.: a compact disc read only memory (CD-ROM)), a digital versatile disc (DVD), magneto-optical media (e.g.: a floptical disc), and a hardware device (e.g.: a read only memory (ROM), a random access memory (RAM), or a flash memory, etc.). In this case, storage media are generally included as some of the components of the electronic device 100, but they may be installed through the port of the electronic device 100. Alternatively, storage media may be included in external devices (e.g., a cloud, a server, or another electronic device) located outside the electronic device 100. Also, programs may be stored while being divided in a plurality of storage media, and here, at least some of the plurality of storage media may be located in external devices of the electronic device 100.

Instructions may include not only a machine language code manufactured by a compiler, but also a high-level language code that can be executed by a computer by using an interpreter, etc. The aforementioned hardware device may be constituted to operate as at least one software module for performing the operations of the various embodiments of the disclosure, and the same is true vice versa.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. In addition, it is intended that such modifications are not to be interpreted independently from the technical idea or prospect of the disclosure.

What is claimed is:

1. An electronic device comprising:
a display; and
a processor for controlling the electronic device to operate in one of a wallpaper mode and a content mode,
wherein the processor is configured to:
based on a first user command being input while the display operates in the content mode for reproducing a broadcast content, control the display to change the broadcast content to a first user interface (UI) for entering the wallpaper mode and display the first UI for entering the wallpaper mode, the first user command being a command to turn off a power of the electronic device, control the electronic device to operate in the wallpaper mode based on a third user command being input within a predetermined time while the first UI is displayed, and in the absence of the third user command being input within the predetermined time, turn off the electronic device, and based on a second user command being input while the display operates in the content mode, control the display to change the broadcast content to a preset wallpaper and display the preset wallpaper, wherein the second user command is input by a wallpaper button of a remote control device.

2. The electronic device of claim 1, wherein the processor is configured to:

based on a user command being input while the first UI is displayed, control the display to change the first UI to a wallpaper setting screen for setting a wallpaper and display the wallpaper setting screen.

3. The electronic device of claim 1, wherein the processor is configured to:

in the presence of the preset wallpaper, based on the third user command being input while the first UI is displayed, control the display to change the first UI to the preset wallpaper and display the preset wallpaper.

4. The electronic device of claim 1, wherein the processor is configured to:

based on the third user command not being input while the first UI is displayed, gradually decrease a size of the first UI.

5. The electronic device of claim 4, wherein the processor is configured to:

based on the first UI disappearing, turn off the power of the electronic device.

6. The electronic device of claim 3, wherein a size of the first UI in the absence of the preset wallpaper and a size of the first UI in the presence of the preset wallpaper are different.

7. The electronic device of claim 2, wherein the processor is configured to:

based on the first user command being input for greater than or equal to a preset number of times, turn off the power of the electronic device without displaying the first UI.

8. The electronic device of claim 1, wherein the second user command is a conversion command for converting the display to the wallpaper mode, and the processor is configured to:

in the presence of the preset wallpaper, based on the second user command being input, control the display to display the preset wallpaper.

9. The electronic device of claim 1, wherein the processor is configured to:

in the absence of the preset wallpaper, based on the second user command being input while the display operates in the content mode, control the display to change the broadcast content to a wallpaper setting screen for setting a wallpaper and display the wallpaper setting screen.

10. A display method of an electronic device operating in one of a wallpaper mode and a content mode, the display method comprising:

based on a first user command being input while a display operates in the content mode for reproducing a broadcast content, changing the broadcast content to a first user interface (UI) for entering the wallpaper mode and displaying the first UI for entering the wallpaper mode, the first user command being a command to turn off a power of the electronic device, controlling the electronic device to operate in the wallpaper mode based on a third user command being input within a predetermined time while the first UI is displayed, and in the absence of the third user command being input within the predetermined time, turning off the electronic device; and based on a second user command being input while the display operates in the content mode, changing the broadcast content to a preset wallpaper and displaying the preset wallpaper, wherein the second user command is input by selecting a wallpaper button of a remote control device.

11. The display method of claim 10, further comprising:

based on a user command being input while the first UI is displayed, changing the first UI to a wallpaper setting screen for setting a wallpaper and displaying the wallpaper setting screen.

12. The display method of claim 10, wherein the changing the broadcast content and displaying the first UI further comprises:

in the presence of the preset wallpaper, based on the third user command being input while the first UI is displayed, changing the first UI to the preset wallpaper and displaying the preset wallpaper.

13. The display method of claim 10, further comprising:

based on the third user command not being input while the first UI is displayed, gradually decreasing a size of the first UI.

14. The display method of claim 13, further comprising:

based on the first UI disappearing, turning off the power of the electronic device.

15. The display method of claim 12, wherein a size of the first UI in the absence of the preset wallpaper and a size of the first UI in the presence of the preset wallpaper are different.

16. The display method of claim 11, further comprising:

based on the first user command being input for greater than or equal to a preset number of times, turning off the power of the electronic device without displaying the first UI.

* * * * *